(12) United States Patent
Masuda

(10) Patent No.: US 9,199,538 B2
(45) Date of Patent: Dec. 1, 2015

(54) CHARGE CONTROLLER FOR ELECTRICALLY POWERED VEHICLE CONFIGURED TO ALLOW CHARGING OF A POWER STORAGE DEVICE FOR DRIVING THE VEHICLE FROM A POWER SOURCE OUTSIDE OF THE VEHICLE

(75) Inventor: Tomokazu Masuda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 816 days.

(21) Appl. No.: 13/379,828

(22) PCT Filed: Jun. 24, 2009

(86) PCT No.: PCT/JP2009/061445
§ 371 (c)(1),
(2), (4) Date: Dec. 21, 2011

(87) PCT Pub. No.: WO2010/150360
PCT Pub. Date: Dec. 29, 2010

(65) Prior Publication Data
US 2012/0098490 A1  Apr. 26, 2012

(51) Int. Cl.
*H02J 7/00* (2006.01)
*B60L 3/00* (2006.01)
*B60L 3/04* (2006.01)
(Continued)

(52) U.S. Cl.
CPC ............. *B60L 3/0069* (2013.01); *B60L 3/04* (2013.01); *B60L 7/14* (2013.01); *B60L 11/005* (2013.01); *B60L 11/1818* (2013.01);
(Continued)

(58) Field of Classification Search
CPC ... Y02T 90/14; Y02T 90/121; B60L 11/1816; B60L 11/1818; B60L 2230/12
USPC .......................................................... 320/109
See application file for complete search history.

(56) References Cited

U.S. PATENT DOCUMENTS 5,202,617 A * 4/1993 Nor ............................... 320/130
5,596,258 A * 1/1997 Kimura et al. ................ 320/163
(Continued)

FOREIGN PATENT DOCUMENTS

CN    101420132 A    4/2009
JP    A-7-67210      3/1995
(Continued)

OTHER PUBLICATIONS

SAE International, *Surface Vehicle Recommended Practice*, Nov. 2001, pp. 1-32.
(Continued)

*Primary Examiner* — Yalikew Fantu
*Assistant Examiner* — Manuel Hernandez
(74) *Attorney, Agent, or Firm* — Oliff PLC

(57) ABSTRACT

A charging connector includes a lock button for locking the charging connector in a charging inlet, and a limit switch for electrically connecting a control pilot line and a ground line to each other in response to an operation of the lock button. The vehicle inlet includes a switch circuit for selectively connecting the control pilot line and the ground line with a resistance circuit, depending on whether a charging lid is open or closed. A CPU is configured to be able to supply a voltage to the control pilot line, and based on a potential of a control signal in accordance with presence/absence of voltage supply to the control pilot line, it detects the state of connection of a charging cable and the state of control pilot line.

11 Claims, 14 Drawing Sheets

(51) Int. Cl.
*B60L 7/14* (2006.01)
*B60L 11/00* (2006.01)
*B60L 11/18* (2006.01)
*B60L 15/20* (2006.01)

(52) U.S. Cl.
CPC ........ *B60L 11/1824* (2013.01); *B60L 15/2009* (2013.01); *B60L 2210/30* (2013.01); *B60L 2220/14* (2013.01); *B60L 2230/12* (2013.01); *B60L 2240/421* (2013.01); *B60L 2240/423* (2013.01); *B60L 2240/527* (2013.01); *B60L 2240/529* (2013.01); *B60L 2240/547* (2013.01); *B60L 2240/549* (2013.01); *Y02T 10/642* (2013.01); *Y02T 10/7005* (2013.01); *Y02T 10/7022* (2013.01); *Y02T 10/7088* (2013.01); *Y02T 10/7241* (2013.01); *Y02T 10/7275* (2013.01); *Y02T 90/121* (2013.01); *Y02T 90/127* (2013.01); *Y02T 90/14* (2013.01)

(56) References Cited

U.S. PATENT DOCUMENTS

| | | | |
|---|---|---|---|
| 5,637,977 | A | 6/1997 | Saito et al. |
| 2009/0102433 | A1 | 4/2009 | Kamaga |
| 2010/0174667 | A1* | 7/2010 | Vitale et al. ................... 705/412 |
| 2010/0194354 | A1* | 8/2010 | Gotou et al. .................. 320/163 |
| 2010/0204859 | A1 | 8/2010 | Kamaga |
| 2010/0213896 | A1 | 8/2010 | Ishii et al. |
| 2013/0201641 | A1* | 8/2013 | Soden ....................... B60L 3/04 361/752 |
| 2015/0160281 | A1* | 6/2015 | Zaki ......................... B60L 3/12 324/543 |
| 2015/0219705 | A1* | 8/2015 | Zaki ......................... B60L 3/12 324/503 |

FOREIGN PATENT DOCUMENTS

| | | |
|---|---|---|
| JP | A-2009-60728 | 3/2009 |
| JP | A-2009-71989 | 4/2009 |
| JP | A-2009-100565 | 5/2009 |
| JP | A-2009-106053 | 5/2009 |

OTHER PUBLICATIONS

International Search Report issued in International Application No. PCT/JP2009/061445 on Sep. 15, 2009 (with translation).

* cited by examiner

FIG.7

| CHK | SW2 | PILOT SIGNAL CPLT[V] | STATE |
|---|---|---|---|
| L | OFF | $V1$ | CONNECTED TO VEHICLE |
| | | $V1 \cdot \dfrac{R7}{R1+R7}$ | SWITCH CIRCUIT FIXED TO I SIDE |
| | | $V1 \cdot \dfrac{R6}{R1+R6}$ | CHARGING CONNECTOR HALF-FIT |
| | | | LIMIT SWITCH FIXED TO ON |
| | | 0 | NO VOLTAGE SUPPLIED FROM CCID (CHK L→H) |

FIG.8

| CHK | SW2 | PILOT SIGNAL CPLT[V] | STATE |
|---|---|---|---|
| H | OFF | $V4 \cdot \dfrac{R7}{R4+R7}$ | CHARGING LID CLOSED |
| | | $V4 \cdot \dfrac{R1}{R1+R4}$ | POWER SOURCE RECEPTACLE NOT CONNECTED |
| | | 0 | CONTROL PILOT LINE GND SHORT-CIRCUIT |
| | | $V4$ | NO VOLTAGE DROP ON CPLT (SW2 ON → OFF) |
| | ON | $V4 \cdot \dfrac{R3}{R4+R3}$ | CHARGING LID OPEN |
| | | $V4$ | CONTROL PILOT LINE DISCONNECTED |

| CHK | SW2 | PILOT SIGNAL CPLT[V] | STATE |
|---|---|---|---|
| L | OFF | V1 | CONNECTED TO VEHICLE |
| | | $V1 \cdot \dfrac{R7}{R1+R7}$ | SWITCH CIRCUIT FIXED TO I SIDE |
| | | $V1 \cdot \dfrac{R6}{R1+R6}$ | CHARGING CONNECTOR HALF-FIT |
| | | | LIMIT SWITCH FIXED TO ON |
| | | 0 | NO VOLTAGE SUPPLIED FROM CCID (CHK L→H) |

| CHK | SW2 | PILOT SIGNAL CPLT[V] | STATE |
|---|---|---|---|
| H | OFF | $V4 \cdot \dfrac{R7}{R4+R7}$ | CHARGING LID CLOSED |
| | | 0 | CONTROL PILOT LINE GND SHORT-CIRCUIT |
| | | V4 | NO VOLTAGE DROP ON CPLT (SW2 ON → OFF) |
| | ON | $V4 \cdot \dfrac{R3}{R4+R3}$ | CHARGING LID OPEN |
| | | V4 | CONTROL PILOT LINE DISCONNECTED or POWER SOURCE RECEPTACLE NOT CONNECTED |

FIG.13

| CHK | SW2 | PILOT SIGNAL CPLT[V] | STATE |
|---|---|---|---|
| L | OFF | $V_1$ | CONNECTED TO VEHICLE |
| | | $V_1 \cdot \dfrac{R_6}{R_1+R_6}$ | CHARGING CONNECTOR HALF-FIT / LIMIT SWITCH FIXED TO ON |
| | | 0 | NO VOLTAGE SUPPLIED FROM CCID (CHK L→H) |
| H | OFF | $V_4 \cdot \dfrac{R_1}{R_1+R_4}$ | POWER SOURCE RECEPTACLE NOT CONNECTED |
| | | 0 | CONTROL PILOT LINE GND SHORT-CIRCUIT |
| | | $V_4$ | NO VOLTAGE DROP ON CPLT (SW2 ON → OFF) |
| | ON | $V_4$ | CONTROL PILOT LINE DISCONNECTED |
| | | $V_4 \cdot \dfrac{R_3}{R_3+R_4}$ | CHARGING CONNECTOR NOT CONNECTED |

FIG.14

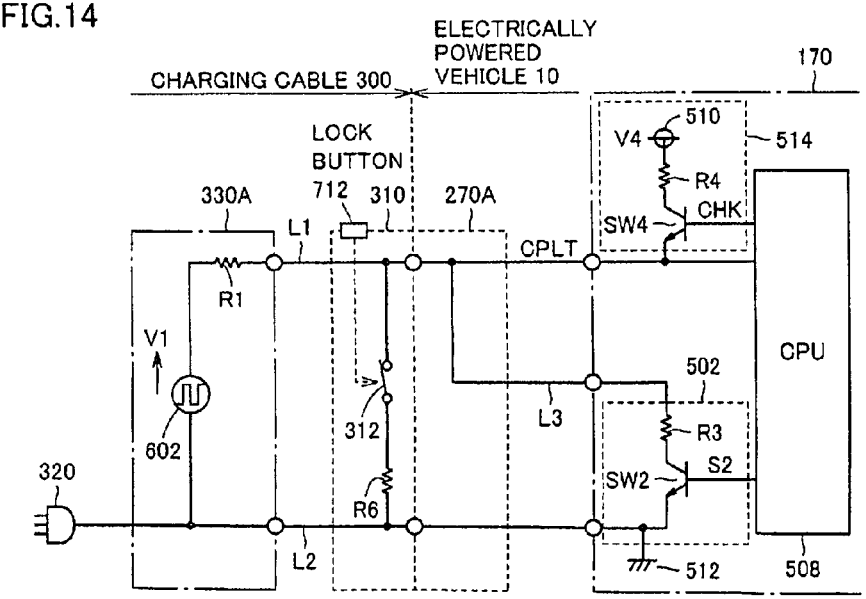

FIG.15

| CHK | SW2 | PILOT SIGNAL CPLT[V] | STATE |
|---|---|---|---|
| L | OFF | $V1$ | CONNECTED TO VEHICLE |
| L | OFF | $V1 \cdot \dfrac{R6}{R1+R6}$ | CHARGING CONNECTOR HALF-FIT / LIMIT SWITCH FIXED TO ON |
| L | OFF | 0 | NO VOLTAGE SUPPLIED FROM CCID (CHK L→H) |
| H | OFF | 0 | CONTROL PILOT LINE GND SHORT-CIRCUIT |
| H | OFF | $V4$ | NO VOLTAGE DROP ON CPLT (SW2 ON → OFF) |
| H | ON | $V4$ | CONTROL PILOT LINE DISCONNECTED or POWER SOURCE RECEPTACLE NOT CONNECTED |
| H | ON | $V4 \cdot \dfrac{R3}{R3+R4}$ | CHARGING CONNECTOR NOT CONNECTED |

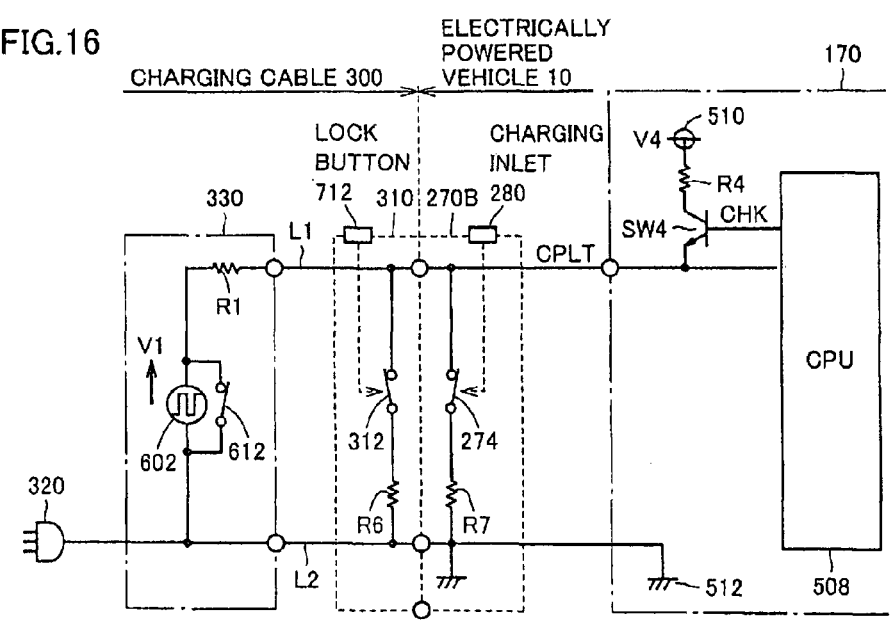

| CHK | PILOT SIGNAL CPLT[V] | STATE |
|---|---|---|
| L | V1 | CONNECTED TO VEHICLE |
| | $V1 \cdot \frac{R6}{R1+R6}$ | CHARGING CONNECTOR HALF-FIT |
| | | LIMIT SWITCH FIXED TO ON |
| | $V1 \cdot \frac{R7}{R1+R7}$ | SWITCH 274 FIXED |
| | 0 | NO VOLTAGE SUPPLIED FROM CCID (CHK L→H) |
| H | $V1 \cdot \frac{R7}{R4+R7}$ | CHARGING LID CLOSED |
| | V4 | CHARGING LID OPEN |
| | | CONTROL PILOT LINE DISCONNECTED |
| | 0 | CONTROL PILOT LINE GND SHORT-CIRCUIT |
| | $V4 \cdot \frac{R1}{R1+R4}$ | POWER SOURCE RECEPTACLE NOT CONNECTED |

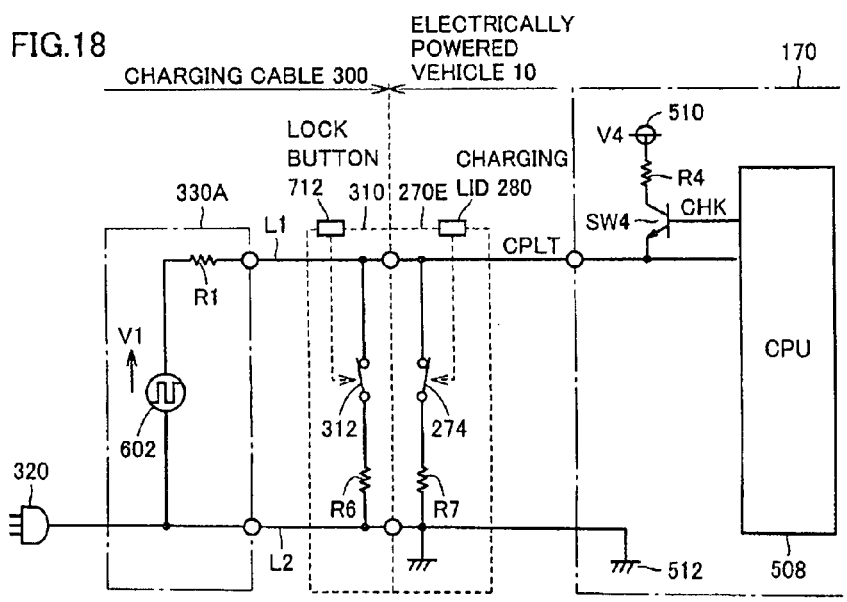

| CHK | PILOT SIGNAL CPLT[V] | STATE |
|---|---|---|
| L | V1 | CONNECTED TO VEHICLE |
| L | $V1 \cdot \dfrac{R6}{R1+R6}$ | CHARGING CONNECTOR HALF-FIT |
| L | $V1 \cdot \dfrac{R6}{R1+R6}$ | LIMIT SWITCH FIXED TO ON |
| L | $V1 \cdot \dfrac{R7}{R1+R7}$ | SWITCH 274 FIXED |
| L | 0 | NO VOLTAGE SUPPLIED FROM CCID (CHK L→H) |
| H | $V1 \cdot \dfrac{R7}{R4+R7}$ | CHARGING LID CLOSED |
| H | V4 | CHARGING LID OPEN |
| H | V4 | CONTROL PILOT LINE DISCONNECTED or POWER SOURCE RECEPTACLE NOT CONNECTED |
| H | 0 | CONTROL PILOT LINE GND SHORT-CIRCUIT |

CHARGE CONTROLLER FOR ELECTRICALLY POWERED VEHICLE CONFIGURED TO ALLOW CHARGING OF A POWER STORAGE DEVICE FOR DRIVING THE VEHICLE FROM A POWER SOURCE OUTSIDE OF THE VEHICLE

TECHNICAL FIELD

The present invention relates to a charge controller for an electrically powered vehicle and, more specifically, to a charge controller used for charging an electrically powered vehicle configured to allow charging of a power storage device for driving the vehicle from a power source outside the vehicle.

BACKGROUND ART

As environmentally friendly vehicles, electrically powered vehicles have been drawing attention in recent years, such as electric vehicles, hybrid vehicles, and fuel cell vehicles. Each of these electrically powered vehicles has a motor for generating driving power for traveling, and a power storage device for storing electric power supplied to the motor. A hybrid vehicle refers to a vehicle having a motor and an internal combustion engine as motive power sources. A fuel cell vehicle refers to a vehicle having a fuel cell as a direct-current power source for driving the vehicle.

For such an electrically powered vehicle, a technique is proposed to charge the power storage device for driving the vehicle, by means of a commercial power source having high power generation efficiency. Particularly drawing attention is a technique of charging a power storage device mounted on an electrically powered vehicle, using a source of commercial electric power supplied to general houses (for example, a source of supplying a relatively low voltage of 100V or 200V).

As a charging system for such an electrically powered vehicle, SAE Electric Vehicle Conductive Charge Coupler (NPL 1) provides standard specifications for a vehicle inlet and a charging connector to facilitate shared usage of a charging cable and a connector among different vehicles.

SAE Electric Vehicle Conductive Charge Coupler defines, as an example, standard specification related to control pilot. The control pilot is defined as a control line connecting a control circuit of an EVSE (Electric Vehicle Supply Equipment) supplying electric power from premises wiring to the vehicle to the ground of the vehicle through control circuitry on the vehicle. Based on pilot signals communicated through this control line, state of connection of charging cable, whether or not power supply is possible from the power source to the vehicle, and rated current of EVSE are determined.

CITATION LIST

Non Patent Literature

NPL 1: SAE Electric Vehicle Conductive Charge Coupler, (the United States), SAE Standards, SAE International, Nov., 2001

SUMMARY OF INVENTION

Technical Problem

In SAE Electric Vehicle Conductive Charge Coupler mentioned above, as means to detect connection of charging connector to a vehicle inlet, it is defined that the means shall provide a signal to activate an EV charge controller and engage EV drive inter lock system. For this purpose, consideration is made of a configuration in which a signal generation circuit is provided for generating a signal indicating state of connection of a charging cable when a charging connector is connected to the vehicle inlet, and based on the generated signal, connection between the electrically powered vehicle and the charging cable is determined.

Further, the pilot signal is a signal indispensable in charge control of an electrically powered vehicle and, therefore, detection of defect or failure of the pilot signal, particularly, detection of a short-circuit or disconnection of a control line for transmitting/receiving the pilot signal is of critical importance in the electrically powered vehicle.

In order to detect the state of connection of charging cable and to detect short-circuit or disconnection of control line, however, dedicated circuitry and wirings for generating and communicating signals representing the state of connection must be newly provided, as described above. This possibly leads to increased scale of circuitry to be housed in a vehicle inlet or in a charging connector.

The present invention was made to solve such a problem and its object is to provide a charge controller for an electrically powered vehicle capable of detecting state of connection of a charging cable and detecting state of a control line communicating the pilot signal, in a simple configuration.

Solution to Problem

According to an aspect, the present invention provides a charge controller for an electrically powered vehicle, configured to enable charging of a power storage device mounted on the electrically powered vehicle from a power source outside of the vehicle. The charge controller for an electrically powered vehicle includes: a charging cable for connecting the power source to the electrically powered vehicle; a charging inlet provided on the electrically powered vehicle, configured to be connectable to the charging cable; and a control device provided on the electrically powered vehicle, for receiving a control signal indicating information of electric power supplied to the electrically powered vehicle, transmitted from the charging cable. The charging cable includes a charging connector configured to be connectable to the charging inlet, a plug configured to be connectable to the power source, and an electric wire unit provided between the charging connector and the plug. The electric wire unit includes a power line for supplying electric power from the power source to the electrically powered vehicle, a control line for communicating the control signal, and a ground line connected to a chassis ground. The control device is configured to be able to supply a voltage to the control line, and detects state of connection of the charging cable and state of the control line, based on potential of the control signal in accordance with presence/absence of voltage supply to the control line.

Preferably, the charging connector includes a lock button for locking the charging connector to the charging inlet, and a first switch configured to electrically connect the control line to the ground line when the lock button is in a released state, and to electrically separate the control line from the ground line when the lock button is in a locked state. The control device detects the state of connection of the charging connector based on potential of the control signal when voltage is not supplied to the control line.

Preferably, the control device is configured to supply a voltage to the control line if it is detected that no potential of the control signal is generated while no voltage is supplied to the control line. The control device detects short-circuit of the control line to the chassis ground based on the potential of the control signal when a voltage is supplied to the control line.

Preferably, the charging cable further includes a charging device configured to generate the control signal to be output to the control line, and a second switch configured to form the control line bypassing the charging device when the plug is not connected to the power source. The control device detects disconnection of the control line and state of connection of the plug based on the potential of the control signal when a voltage is supplied to the control line.

Preferably, the charge controller for an electrically powered vehicle further includes a resistance circuit, mounted on the electrically powered vehicle, configured to change the potential of the control line when connected to the control line. The control device is configured to supply a voltage to the control line if it is detected that no potential of the control signal is generated while no voltage is supplied to the control line. The control device detects short-circuit of the control line to the chassis ground and state of connection of the charging connector, based on the potential of the control signal in accordance with presence/absence of connection of the resistance circuit to the control line, when a voltage is supplied to the control line.

Preferably, the charging cable further includes a charging device configured to generate the control signal to be output to the control line, and a second switch configured to form the control line bypassing the charging device when the plug is not connected to the power source. The control device further detects disconnection of the control line and state of connection of the plug based on the potential of the control signal in accordance with presence/absence of connection of the control line to the resistance circuit, when a voltage is supplied to the control line.

Preferably, the charge controller for an electrically powered vehicle further includes an opening, provided in the electrically powered vehicle, for housing the charging inlet. The charging inlet includes a third switch for electrically connecting the control line to the ground line when a lid of the opening is closed, and for electrically separating the control line from the ground line when the lid is open. The control device is configured to supply a voltage to the control line if it is detected that no potential of the control signal is generated while no voltage is supplied to the control line. The control device further detects open/close state of the lid based on the potential of the control signal when a voltage is supplied to the control line.

Preferably, the charge controller for an electrically powered vehicle further includes a resistance circuit, mounted on the electrically powered vehicle, configured to change the potential of the control line when connected to the control line; and an opening, provided in the electrically powered vehicle, for housing the charging inlet. The charging inlet includes a switch circuit configured to electrically connect the control line to the ground line when a lid of the opening is closed, and to electrically connect the control line to the resistance circuit when the lid is open. The control device further detects open/close state of the lid and a failure of the switch circuit, based on potential of the control signal in accordance with presence/absence of voltage supply to the control line.

Preferably, the charging cable further includes a charging device configured to generate the control signal to be output to the control line, and a second switch configured to form the control line bypassing the charging device when the plug is not connected to the power source. The control device detects disconnection and short-circuit to the chassis ground of the control line and state of connection of the plug based on the potential of the control signal when a voltage is supplied to the control line.

Preferably, the charging inlet further includes a first lighting device drivable in accordance with the control signal.

Preferably, the charging connector further includes a second lighting device drivable in accordance with the control signal.

Advantageous Effects of Invention

According to the present invention, a charge controller for an electrically powered vehicle capable of detecting state of connection of the charging cable and state of control line communicating the pilot signal with a simple configuration can be provided.

BRIEF DESCRIPTION OF DRAWINGS

FIG. 7 illustrates a state of the charge controller detected by the CPU shown in FIG. 6.

FIG. 8 illustrates a state of the charge controller detected by the CPU shown in FIG. 6.

FIG. 13 illustrates a state of the charge controller detected by the CPU shown in FIG. 12.

FIG. 14 is a circuit diagram showing a configuration of a charge controller for an electrically powered vehicle in accordance with a modification of Embodiment 2.

FIG. 15 illustrates a state of the charge controller detected by the CPU shown in FIG. 14.

FIG. 16 is a circuit diagram showing a configuration of a charge controller for an electrically powered vehicle in accordance with Embodiment 3.

FIG. 17 illustrates a state of the charge controller detected by the CPU shown in FIG. 16.

FIG. 18 is a circuit diagram showing a configuration of a charge controller for an electrically powered vehicle in accordance with a modification of Embodiment 3.

FIG. 19 illustrates a state of the charge controller detected by the CPU shown in FIG. 18.

DESCRIPTION OF EMBODIMENTS

Figure 1:
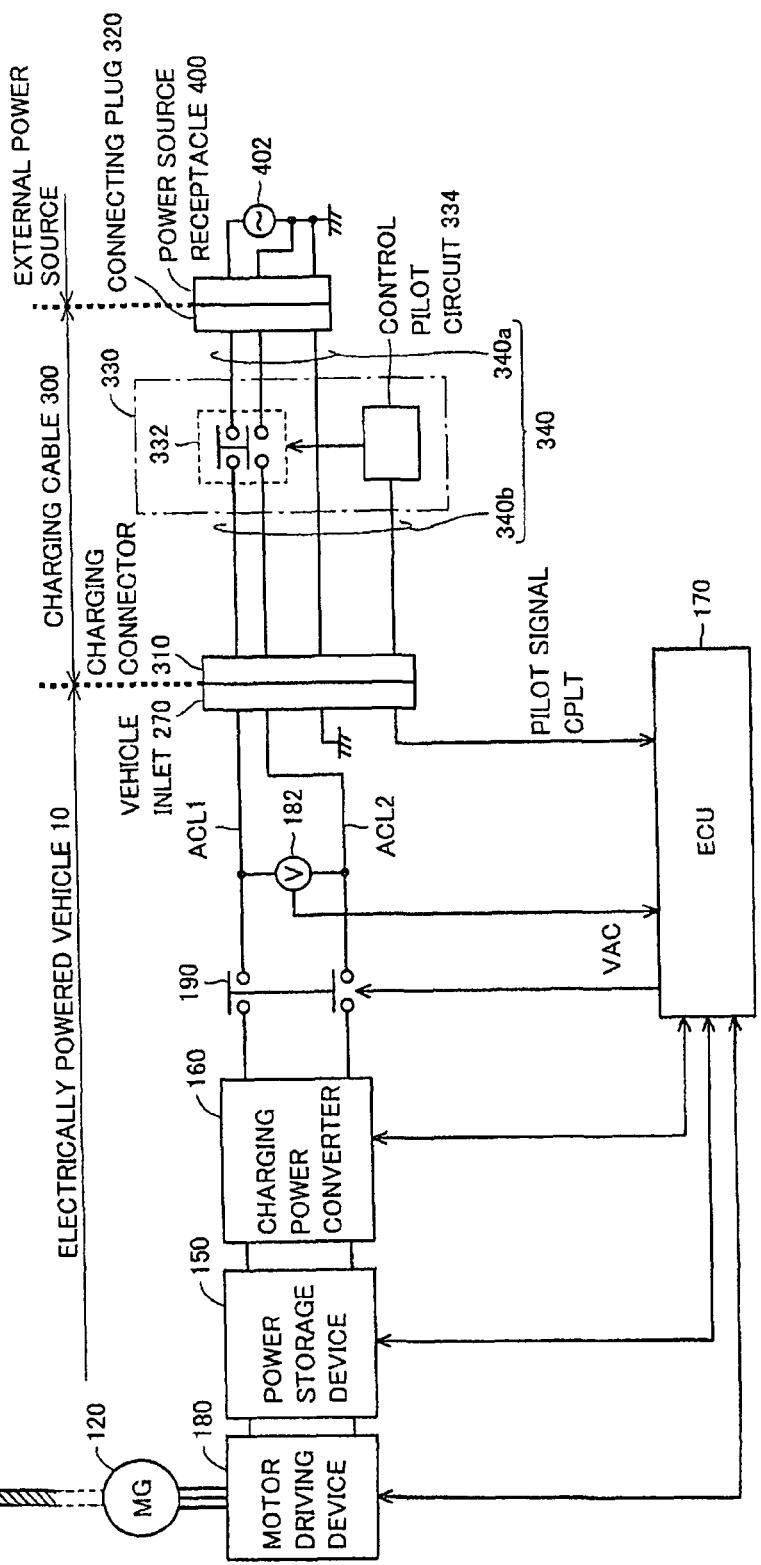
FIG. 1 is a schematic diagram of a charge controller for an electrically powered vehicle in accordance with an embodiment.

Referring to figures, embodiments of the present invention will be described in detail below. It should be noted that the same reference characters in the figures indicate the same or equivalent parts.

FIG. 1 is a schematic diagram of a charge controller for an electrically powered vehicle 10 according to the present embodiment. It should be noted that electrically powered vehicle 10 is not particularly limited in its configuration as long as it is capable of traveling using electric power supplied from its power storage device chargeable by an external power source. Examples of electrically powered vehicle 10 include a hybrid vehicle, an electric vehicle, a fuel cell vehicle, and the like.

Referring to FIG. 1, electrically powered vehicle 10 includes a power storage device 150 for storing electric power used to generate driving power for the vehicle; a motor generator (hereinafter, also referred to as "MG") 120 for generating driving power; a motor driving device 180 for controlling driving of MG 120 using electric power stored in power storage device 150; vehicle wheels 130 that receive the driving power generated by MG 120; and a control device (hereinafter also referred to as "ECU (Electronic Control Unit)") 170 for controlling general operations of electrically powered vehicle 10.

For charging from the external power source, electrically powered vehicle 10 includes a vehicle inlet 270 provided at a body of electrically powered vehicle 10; a relay 190; and a power converter 160 allowing power storage device 150 to be charged by the external power source. Power converter 160 is connected to vehicle inlet 270 via relay 190 by power lines ACL1, ACL2, and is also connected to power storage device 150. Provided between power lines ACL1 and ACL2 is a voltage sensor 182. Voltage sensor 182 provides a result of detection of a voltage (voltage from the external power source) to ECU 170. Further, a pilot signal CPLT output from the side of charging cable 300 is input to ECU 170 via vehicle inlet 270.

Power storage device 150 is a power storage element configured to be chargeable/dischargeable. Power storage device 150 is constituted, for example, by a secondary battery such as a lithium ion battery or a nickel hydrogen battery, or by a power storage element such as an electric double layer capacitor. Further, power storage device 150 further includes a voltage sensor (not shown) connected between the power lines connected to power storage device 150, and a current sensor (not shown) connected to a power line of a positive electrode side or a negative electrode side. ECU 170 receives output voltage and current signals each detected by these sensors.

Power converter 160 for charging is controlled by ECU 170 to convert alternating-current power supplied from external power source 402 via charging cable 300, vehicle inlet 270, power lines ACL1, ACL2, and relay 190, into direct-current power for charging power storage device 150. It should be noted that power storage device 150 can be configured to be directly charged with electric power supplied from external power source 402. In this case, power converter 160 is not provided.

Motor driving device 180 is controlled by ECU 170 to convert electric power stored in power storage device 150, into electric power for controlling driving of MG 120. Representatively, MG 120 is constituted by a permanent magnet type three-phase synchronous motor, and motor driving device 180 is constituted by a three-phase inverter. Output torque of MG 120 is transmitted to vehicle wheels 130 via a power split device and a speed reducer which are not shown, thus traveling electrically powered vehicle 10.

MG 120 can generate electric power using rotation force of vehicle wheels 130, upon regenerative braking operations of electrically powered vehicle 10. The electric power thus generated can be used to charge power storage device 150 using motor driving device 180.

Further, in a hybrid vehicle having an engine (not shown) in addition to MG 120, the engine and MG 120 are operated cooperatively to generate required driving power for the vehicle. In this case, electric power generated by rotation of the engine can be used to charge power storage device 150.

Charging cable 300 includes a charging connector 310 for the vehicle, a plug 320 for the external power source, a charging circuit interrupt device (hereinafter, abbreviated as "CCID") 330, and an electric wire unit 340 for connecting the devices to each other for input/output of electric power and control signals. Electric wire unit 340 includes an electric wire unit 340a for connecting plug 320 and CCID 330 to each other, and an electric wire unit 340b for connecting charging connector 310 and CCID 330 to each other.

Charging connector 310 is configured to be connectable to vehicle inlet 270 provided at the body of electrically powered vehicle 10. Inside charging connector 310, a limit switch (not shown) is provided to detect connection of charging connector 310. The limit switch has one end connected to a control line in charging cable 300 grounded on the vehicle side and on the external power source side, and the other end connected to the control pilot line communicating pilot signal CPLT. When charging connector 310 is connected to vehicle inlet 270, the limit switch operates to electrically connect the control line and the control pilot line to each other.

Plug 320 is connected to a power source receptacle 400 provided in, for example, a house. Power source receptacle 400 is supplied with alternating-current power from external power source 402 (for example, system power source).

CCID 330 includes a CCID relay 332 and a control pilot circuit 334. COD relay 332 is provided for a pair of power lines within charging cable 300. CCID relay 332 is controlled to be on/off, by control pilot circuit 334. When CCID relay 332 is off, the electric power path is disconnected within charging cable 300. On the other hand, when CCID relay 332 is on, electric power can be supplied from external power source 402 to electrically powered vehicle 10.

Control pilot circuit 334 outputs pilot signal CPLT to ECU 170 of the vehicle via charging connector 310 and vehicle inlet 270. Pilot signal CPLT is a signal sent from control pilot circuit 334 to notify the vehicle's ECU 170 of a rated current of the charging cable. Pilot signal CPLT is also used as a signal for remotely controlling CCID relay 332 from ECU 170 based on a potential of pilot signal CPLT controlled by ECU 170. Based on change in the potential of pilot signal CPLT, control pilot circuit 334 controls CCID relay 332 to be on/off. In other words, pilot signal CPLT is exchanged between ECU 170 and CCID 330.

Figure 2:
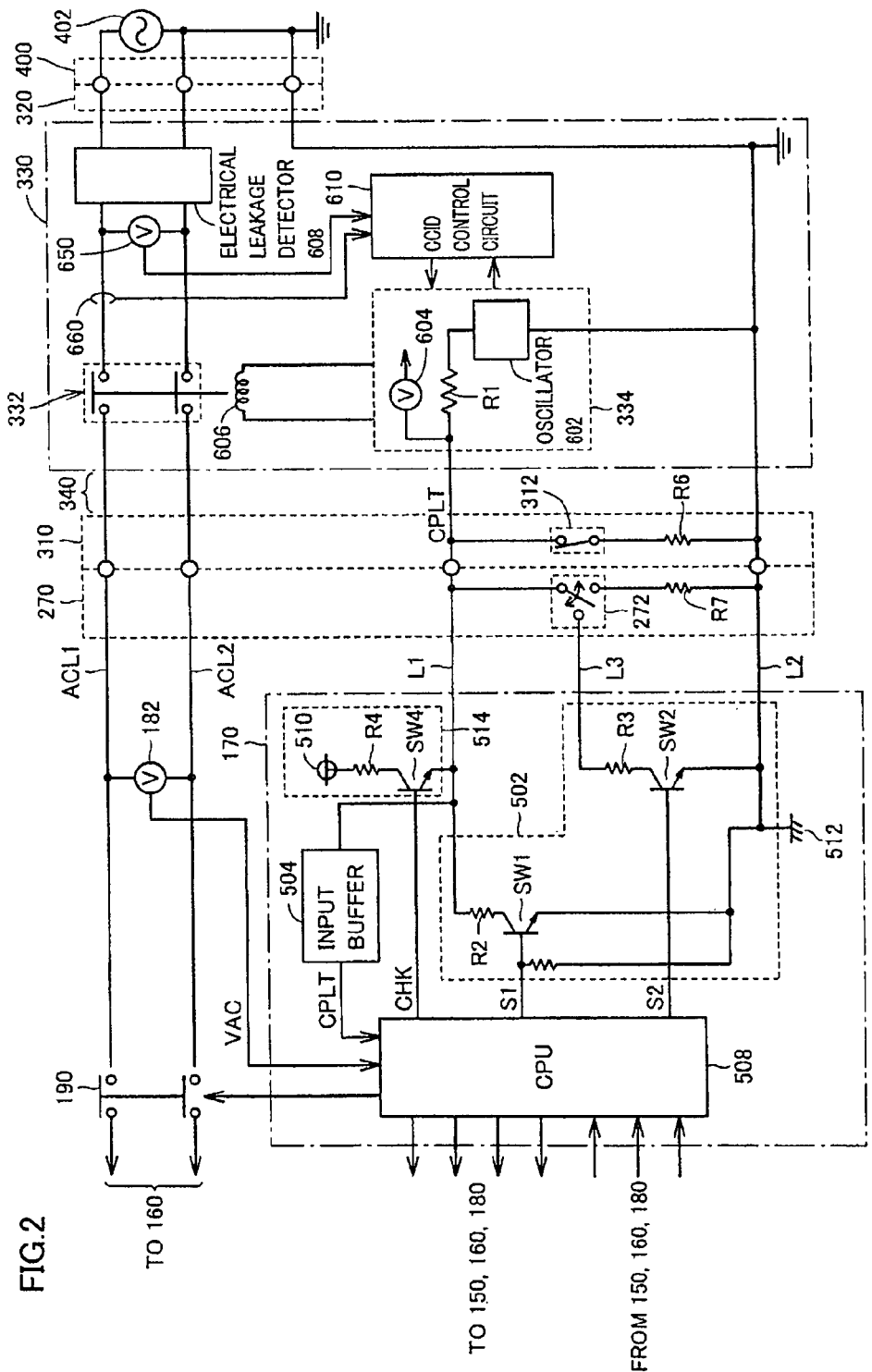
FIG. 2 shows in greater detail the charging mechanism shown in FIG. 1.

FIG. 2 illustrates the charging structure shown in FIG. 1 more in detail.

Referring to FIG. 2, in addition to CCID relay 332 and control pilot circuit 334, CCID 330 includes a magnetic coil 606, an electrical leakage detector 608, CCID control unit 610, a voltage sensor 650, and a current sensor 660. Further, control pilot circuit 334 includes an oscillator 602, a resistance element R1, and a voltage sensor 604.

CCID control unit 610 includes a CPU (Central Processing Unit), a memory device, an input/output buffer, and an indicator, each of which is not shown. CCID control unit 610 sends/receives a signal to/from each sensor and control pilot circuit 334, and controls and manages a charging operation of charging cable 300.

Oscillator 602 outputs a non-oscillating signal when the potential of pilot signal CPLT detected by voltage sensor 604 is around a predetermined potential V1 (for example, 12V), and outputs a signal oscillating at predetermined frequency (for example, 1 kHz) and duty cycle when the potential of pilot signal CPLT is decreased from V1.

It should be noted that the potential of pilot signal CPLT can be controlled from ECU 170 of the vehicle as described below. The duty cycle is set based on a rated current that can be supplied from external power source 402 to the vehicle via the charging cable.

Figure 3:
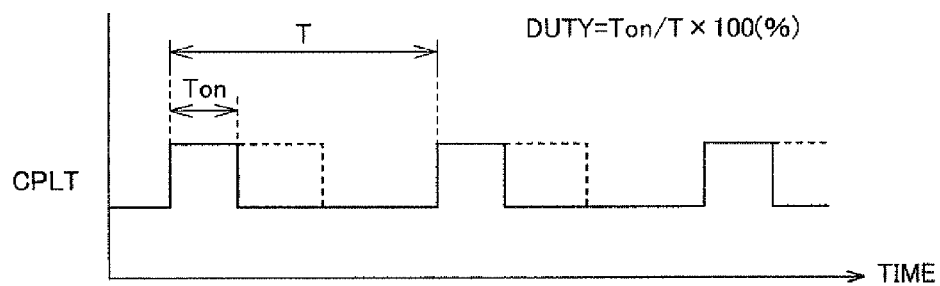
FIG. 3 shows an exemplary waveform of a pilot signal CPLT generated by a control pilot circuit shown in FIG. 2.

FIG. 3 illustrates an exemplary waveform of pilot signal CPLT generated by control pilot circuit 334 shown in FIG. 2.

Referring to FIG. 3, pilot signal CPLT oscillates at a predetermined cycle T when the potential of pilot signal CPLT is decreased from V1 as described above. Here, pulse width Ton of pilot signal CPLT is set based on the rated current that can be supplied from external power source 402 to electrically powered vehicle 10 via charging cable 300. Namely, by means of the duty of pilot signal CPLT represented by a ratio of pulse width Ton to cycle T, ECU 170 of electrically powered vehicle 10 is notified of the rated current from control pilot circuit 334.

It should be noted that the rated current is set for each charging cable. When a different type of charging cable is used, the rated current differs. Hence, the duty of pilot signal CPLT differs for each charging cable.

Based on the duty of pilot signal CPLT received via a control pilot line L1, ECU 170 of electrically powered vehicle 10 can detect the rated current that can be supplied from external power source 402 to the vehicle via charging cable 300.

Referring to FIG. 2 again, when ECU 170 causes decrease of the potential of pilot signal CPLT to around a predetermined potential V3 (for example, 6V), control pilot circuit 334 supplies a current to magnetic coil 606. When supplied with the current from control pilot circuit 334, magnetic coil 606 generates electromagnetic force to bring CCID relay 332 into the on state.

Electrical leakage detector 608 is provided in CCID 330 for the pair of power lines of the charging cable to detect whether or not electrical leakage has occurred. Specifically, electrical leakage detector 608 detects a state of equilibrium of currents flowing in the pair of power lines in opposite directions, and detects occurrence of electrical leakage when the state of equilibrium is lost. Although it is not particularly shown in the figure, when electrical leakage detector 608 detects electrical leakage, the supply of electric power to magnetic coil 606 is interrupted to turn off CCID relay 332.

Voltage sensor 650 detects that plug 320 of charging cable 300 for the external power source is inserted into power source receptacle 400 and is therefore connected to external power source 402, and notifies CCID control unit 610 of it. Current sensor 660 detects a charging current flowing in a power line to detect actual start of charging from external power source 402 to electrically powered vehicle 10, and notifies CCID control unit 610 of it.

Meanwhile, in the vehicle, ECU 170 includes a resistance circuit 502, a voltage generating circuit 514, an input buffer 504 and a CPU 508.

Resistance circuit 502 includes pull-down resistors R2, R3, and switches SW1, SW2. Pull-down resistor R2 and switch SW1 are connected in series between control pilot line L1, through which pilot signal CPLT is communicated, and a chassis ground 512. Pull-down resistor R3 and switch SW2 are connected in series between a signal line L3 branched from control pilot line L1 and a ground line L3 connected to chassis ground 512. The branch of signal line L3 from control pilot line L1 is realized by a switch circuit 272 provided in vehicle inlet 270. Switches SW1, SW2 are turned on/off according to control signals S1, S2 from CPU 508.

Resistance circuit 502 is a circuit adapted to control the potential of pilot signal CPLT from the vehicle side. In other words, when charging connector 310 is connected to vehicle inlet 270, switch SW2 is turned on according to control signal S2 and resistance circuit 502 decreases the potential of pilot signal CPLT to a predetermined potential V2 (for example, 9V) using pull-down resistor R3. Further, when check for welding of the relay and the like is completed in electrically powered vehicle 10, switch SW1 is turned on according to control signal S1 and resistance circuit 502 decreases the potential of pilot signal CPLT to a predetermined potential V3 (for example, 6V) using pull-down resistors R2, R3. By controlling the potential of pilot signal CPLT using resistance circuit 502 as such, CCID relay 332 can be remotely controlled from ECU 170.

By detecting change in the potential of pilot signal CPLT from 0V to predetermined potential V1, CCID control unit 610 can detect that plug 320 of charging cable 300 has been brought into connection with power source receptacle 400. Further, by detecting change in the potential of pilot signal CPLT from predetermined potential V1 to V2, CCID control unit 610 can detect that charging connector 310 of charging cable 300 has been brought into connection with vehicle inlet 270 of electrically powered vehicle 10.

Voltage generating circuit 514 includes a power source node 510, a pull-up resistor R4, and a switch SW4. Pull-up resistor R4 and switch SW4 are connected in series between power source node 510 and control pilot line L1. Switch SW4 is turned on/off in response to a control signal CHK from CPU 508.

Control signal CHK is a signal generated from CPU 508 to detect the state of connection of charging cable 310 and to detect the state of control pilot line L1. When switch SW4 receives control signal CHK at H (logic high) level and thereby turned on, a voltage determined by the voltage of power source node 510, pull-up resistor R4 and pull-down resistor connected to ground line L2 is generated on control pilot line L1. At this time, the pull-down resistor connected to ground line L2 differs depending on the state of connection of charging cable 300, as will be described later and, therefore, the potential of pilot signal CPLT changes depending on the state of connection of charging cable 300. Further, the potential of pilot signal CPLT also changes depending on the state of control pilot line L1. Therefore, by monitoring the potential of control pilot line L1, it is possible to detect the state of connection of charging cable 300 and to detect the state of control pilot line L1.

Inside charging connector 310, a limit switch 312 and a pull-down resistor R6 are connected in series between control pilot line L1 and ground line L2. Limit switch 312 electrically connects control pilot line L1 and ground line L2 to each other in response to an operation of a lock button (not shown) locking charging connector 310 to vehicle inlet 270.

Further, inside vehicle inlet 270, a switch circuit 272 and a pull-down resistor R7 are connected in series between control pilot line L1 and ground line L2. Switch circuit 272 is configured to allow connection of control pilot line L1 either to signal line L3 or to pull-down resistor R7 depending on whether a charging lid, not shown, is open or closed.

In such a configuration, CPU 508 determines connection between external power source 402 and electrically powered vehicle 10 based on pilot signal CPLT. Specifically, CPU 508 detects connection between plug 320 and power source receptacle 400 based on whether or not the pilot signal CPLT is input or not, received from input buffer 504. Further, CPU 508 determines connection between vehicle inlet 270 and charging connector 310 based on the potential of pilot signal CPLT received from input buffer 504. Further, CPU 508 detects the state of control pilot line L1 based on the potential of pilot signal CPLT. The state of control pilot line L1 includes disconnection and short-circuit of control pilot line L1.

When the connection between vehicle inlet 270 and charging connector 310 is detected and control pilot line L1 is determined to be normal, CPU 508 activates control signal 52. Accordingly, the potential of pilot signal CPLT decreases from V1, whereby pilot signal CPLT oscillates. Then, CPU 508 detects based on the duty cycle of pilot signal CPLT a rated current that can be supplied from external power source 402 to electrically powered vehicle 10.

When the rated current is detected, CPU 508 activates control signal S1. Accordingly, the potential of pilot signal CPLT is decreased to V3, thereby turning on CCID relay 332 in CCID 330. Thereafter, CPU 508 turns on relay 190 (FIG. 1). In this way, power converter 160 for charging (FIG. 1) is supplied with alternating-current power from external power source 402, thus completing preparation of charging from external power source 402 to power storage device 150 (FIG. 1). Then, CPU 508 sends a control signal to power converter 160 for charging (FIG. 1) to start electric power conversion. In this way, power storage device 150 (FIG. 1) is charged.

Figure 4:
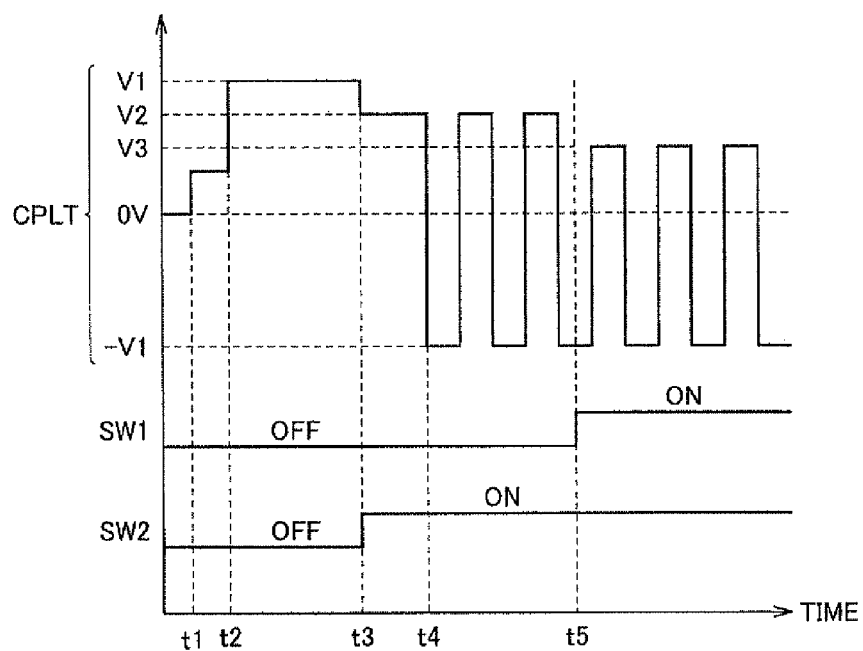
FIG. 4 is a timing chart of pilot signals and switches at the start of charging.

Next, change in the potential of pilot signal CPLT will be described with reference to FIG. 4. FIG. 4 is a timing chart of pilot signal CPLT and switches SW1, SW2 upon the start of charging.

Referring to FIG. 4 and FIG. 2, when plug 320 of charging cable 300 is connected to power source receptacle 400 of external power source 402 at time t1, control pilot circuit 334 receives electric power from external power source 402 and generates pilot signal CPLT.

At time t1, charging connector 310 of charging cable 300 is not connected to vehicle inlet 270, and limit switch 312 of charging connector 310 is on. Therefore, on pilot signal CPLT, a voltage corresponding to the predetermined potential V1 (for example, 12V) divided by resistance element RI of control pilot circuit 334 and pull-down resistor R6 of charging connector 310 generates. It is noted that pilot signal CPLT is non-oscillating. By detecting the potential of pilot signal CPLT changing to potential of the divided voltage, CCM control unit 610 can detect that plug 320 is connected to power source receptacle 400.

At time t2, when charging connector 310 is connected to vehicle inlet 270, limit switch 312 of charging connector 312 is turned off and, therefore, the potential of pilot signal CPLT increases to V1. When connection between charging connector 310 and vehicle inlet 270 is detected from the change in potential of pilot signal CPLT to V1, at time t3, CPU 508 turns on switch SW2. Accordingly, the potential of pilot signal CPLT is decreased to V2 (for example, 9V) by pull-down resistor R3 of resistance circuit 502.

With the potential of pilot signal CPLT being decreased to V2, CCID control unit 610 can detect that charging connector 310 has been brought into connection with vehicle inlet 270. Then, at time t4, control pilot circuit 334 causes pilot signal CPLT to oscillate.

When pilot signal CPLT is brought into the oscillating state, CPU 508 detects the rated current based on the duty of pilot signal CPLT. Thereafter, when the preparation for control of charging is completed in the vehicle, CPU 508 turns on switch SW1 at time t5. Accordingly, the potential of pilot signal CPLT is decreased to V3 (for example, 6V) by pull-down resistors R2 and R3 of resistance circuit 502.

When the potential of pilot signal CPLT is decreased to V3, a current is supplied from control pilot circuit 334 to magnetic coil 606 to turn on relay 332 of CCID 330. Thereafter, by the above-described control by CPU 508, power storage device 150 is charged from external power source 402.

Since the change in the potential of pilot signal CPLT as shown in FIG. 4 is standardized by the SAE Standards, change in the potential upon charging is controlled to be similar even among different manufacturers and different cars. Thus, the charging cable can be shared among different manufacturers and different cars.

It should be noted that in the present embodiment, pilot signal CPLT corresponds to a "control signal", control pilot line L1 corresponds to "control line" and ground line L2 corresponds to "ground line."

The description above deals with the case where plug 320 for the external power source is connected before charging connector 310 for the vehicle is connected. However, even when charging connector 310 for the vehicle is connected before plug 320 for the external power source is connected, CPU 508 in electrically powered vehicle 10 turns on switch SW2 after receiving and confirming pilot signal CPLT from CCID 330. Hence, change in the potential of pilot signal CPLT is similar to that in FIG. 4.

Embodiment 1

In the following, a configuration of charge controller for an electrically powered vehicle in accordance with Embodiment 1 will be described with reference to FIGS. 5 and 6.

Figure 5:
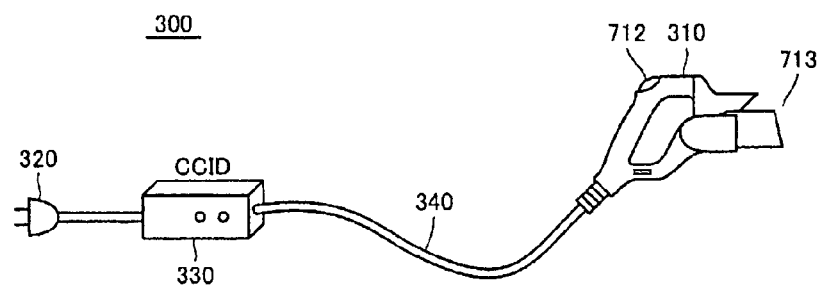
FIG. 5 schematically shows an appearance of a charging cable in accordance with Embodiment 1.

FIG. 5 schematically shows an external appearance of charging cable 300 according to Embodiment 1.

Referring to FIG. 5, charging cable 300 includes plug 320 to be connected to a power source external to the vehicle; CCID 330; electric wire unit 340; and charging connector 310. Charging connector 310 has a connection unit 713 to be connected to the vehicle.

Charging connector 310 is connected to one end of electric wire unit 340. To the other end of electric wire unit 340, plug 320 is connected as a connection unit to be connected to the power source. Between charging connector 310 and plug 320 in electric wire unit 340, CCID 330 is provided.

Charging connector 310 is provided with a lock button 712. A locking mechanism not shown in the figure is provided therein to prevent charging connector 310 from being detached from the vehicle even if force of pulling it out is exerted after charging connector 310 is connected to the vehicle. By pushing lock button 712, charging connector 310 connected to the vehicle can be detached therefrom.

Figure 6:
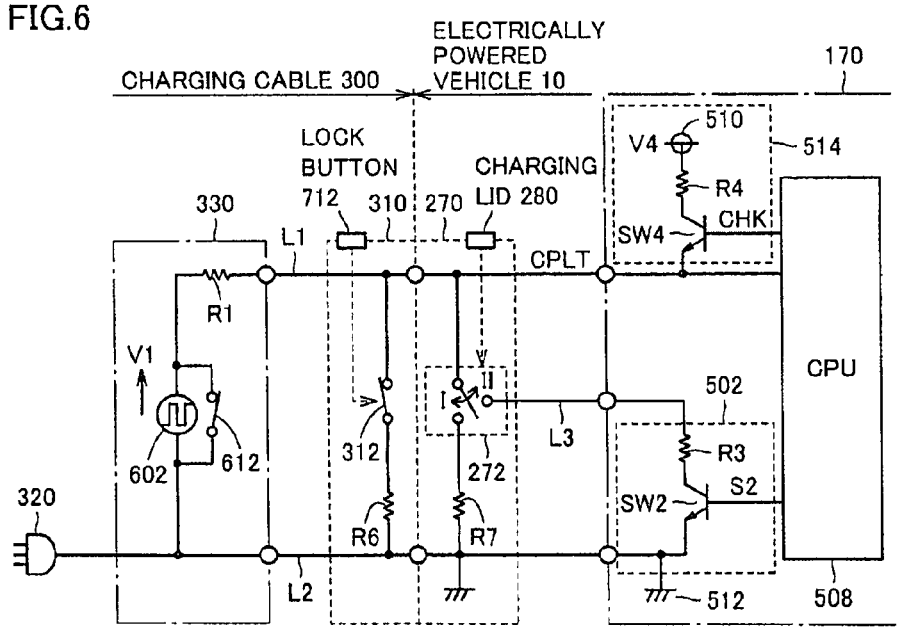
FIG. 6 shows a connection portion between a part of the charging cable and a vehicle side ECU.

FIG. 6 shows a portion at which a part of charging cable 300 and ECU 170 of the vehicle are connected to each other. FIG. 6 shows a portion of the configuration shown in FIG. 2 in a simplified manner.

Referring to FIGS. 2 and 6, charging cable 300 includes: charging connector 310 configured to be connectable to vehicle inlet 270; plug 320 for connection to the external power source; CCID 330; and the electric wire unit provided between CCID 330 and charging connector 310.

The electric wire unit includes a power line (not shown) for supplying electric power from the power source to electrically powered vehicle 10; a control pilot line L1 for communicating pilot signal CPLT; and a ground line L2 connected to chassis ground 512.

In CCID 330, when the potential of pilot signal CPLT detected by voltage sensor 604 (FIG. 2) is around the predetermined potential V1 (for example, 12V), oscillator 602 outputs a non-oscillating signal. CCID 330 includes a switch 612 for forming control pilot line L1, bypassing oscillator 602. Switch 612 is configured to be turned on when plug 320 is not connected to power source receptacle 400 (FIG. 2) and turned off when plug 320 is connected to power source receptacle 400.

Charging connector 310 includes lock button 712 for locking charging connector 310 to vehicle inlet 270, and limit switch 312 for electrically connecting control pilot line L1 to ground line L2 in accordance with an operation of lock button 712.

Lock button 712 can be operated between locked and released states. When lock button 712 is pressed, lock button 712 is brought into the released state, thus allowing charging connector 310 to be detached from electrically powered vehicle 10. By taking off a hand from lock button 712, lock button 712 is set to the locked state, thus locking charging connector 310 to prevent charging connector 310 from being detached from vehicle inlet 270 when connected thereto. Limit switch 312 electrically connects control pilot line L1 to ground line L2 in the released state, and electrically separates control pilot line L1 from ground line L2 in the locked state.

With such a configuration, when lock button 712 is pressed before connecting charging connector 310, limit switch 312 is turned on and control pilot line L1 is electrically connected to ground line L2. Accordingly, the voltage corresponding to the predetermined potential V1 divided by resistance element R1 in CCID 330 and pull-down resistor R6 in charging connector 310 generates on control pilot line L1.

By taking one's hand off lock button 712 after connecting charging connector 310 to vehicle inlet 270, limit switch 312 is turned off, and control pilot line L1 and ground line L2 are electrically separated from each other. As a result, the potential of control pilot line L1 increases to the predetermined potential V1

On the side of electrically powered vehicle 10, vehicle inlet 270 configured to be connectable to charging connector 310, and. ECU 170 for receiving pilot signal CPLT transmitted from charging cable 300 are provided.

Vehicle inlet 270 includes switch circuit 272 and pull-down resistor R7 connected in series between control pilot line L1 and ground line L2.

Switch circuit 272 is configured to switch connection between control pilot line L1 and ground line L2 and signal line L3, in accordance with the open/close state of charging lid 280. Specifically, when switch circuit 272 is set to the I side, control pilot line L1 is electrically connected to ground line L2. On the contrary, when switch circuit 272 is set to the II side, control pilot line L1 is electrically connected to signal line L3.

Whether switch circuit 272 is to be connected to the I side or II side is controlled in accordance with the open/close state of charging lid 280. Specifically, charging lid 280 constitutes a cover for preventing entrance of moisture or dust to vehicle inlet 270 and, by way of example, it is opened by a charging lid opener motor, not shown. The charging lid opener motor is a small electric motor, and it opens charging lid 280 upon reception of an open instruction from CPU 508. The open instruction is a signal issued from CPU 508 when the charging lid opener switch provided inside the vehicle is turned on.

Switch circuit 272 is set to the I side when charging lid 280 is open and to the II side when charging lid 280 is closed. When switch circuit 272 is set to the II side, resistance circuit 502 in ECU 170 comes to be connected between ground line L2 and signal line L3 branched from control pilot line L1.

As described above, a plurality of switches each turned on/off in accordance with the open/close state of charging lid 280 and in accordance with the operation of lock button 712 are connected in parallel between control pilot line L1 and ground line L2. Therefore, the potential of pilot signal CPLT changes in accordance with the state of connection of charging connector 310 and on the open/close state of charging lid 280. Thus, it is possible for CPU 508 to detect these states by monitoring the potential of pilot signal CPLT.

Further, CPU 508 is configured to be capable of operating potential of pilot signal CPLT using voltage generating circuit 514 and resistance circuit 502. Therefore, by appropriately driving these circuits, it is possible to detect details of the state of connection of charging cable 300 and the state of control pilot line L1, as will be described in the following, FIGS. 7 and 8 illustrate states of charge controller detected by CPU 508 of FIG. 6.

FIG. 7 shows a state between the potential of pilot signal CPLT and the state of charge controller when switch SW4 of voltage generating circuit 514 is off and switch SW2 of resistance circuit 502 is off. It is noted that switch SW4 is turned off upon reception of L-level control signal CHK, and switch SW2 is turned off upon reception of L-level control signal S2 from CPU 508.

Referring to FIG. 7, when external power source 402 and electrically powered vehicle 10 are connected, that is, when plug 320 is connected to power source receptacle 400 and charging connector 310 is connected to vehicle inlet 270, the potential of pilot signal CPLT is the predetermined potential V1.

In contrast, in case of malfunction that switch circuit 272 of vehicle inlet 270 is fixed to the I side, the potential of pilot signal CPLT decreases to the voltage corresponding to the predetermined potential V1 divided by resistance element R1 in CCID 330 and pull-down resistor R7 of vehicle inlet 270.

Further, if charging connector 310 is not fully fit in vehicle inlet 270 and hence charging connector 310 is not locked in vehicle inlet 270 (in the following, also referred to as half-fit state), limit switch 312 is on. Therefore, the potential of pilot signal CPLT decreases to the voltage corresponding to the predetermined potential V1 divided by resistance element RI in CCID 330 and pull-down resistor R6 in charging connector 310.

If the potential of pilot signal CPLT mentioned above should be decreased even if charging connector 310 is not in the half-fit state, it can be determined that limit switch 312 is on-fixed (welded to the on-state).

Further, if no voltage is supplied from CCID 330, no potential generates on control pilot line L1, and the potential of pilot signal CPLT attains to the ground level. In this case, in ECU 170, CPU 508 drives voltage generating circuit 514 (that is, switches control signal CHK to the H level), to generate a voltage on control pilot line L1. In this manner, the factors can be classified as shown in FIG. 8.

FIG. 8 shows the relation between the potential of pilot signal CPLT and the state of charge controller when switch SW4 of voltage generating circuit 514 is turned on. It is noted that switch SW4 is turned on upon reception of H-level control signal CHK from CPU 508.

Referring to FIG. 8, when switch SW4 is turned on and voltage V4 of power source node 510 is supplied to control pilot line L1, the potential of pilot signal CPLT attains to a potential defined by the voltage V4 of power source node 510, pull-up resistor R4 and pull-down resistor R7 connected to ground line L2, if charging lid 280 is closed.

In contrast, when plug 320 and power source receptacle 400 are not connected to each other, a bypass switch 612 in CCID 330 is turned on and, therefore, the potential of pilot signal CPLT attains to the potential determined by the voltage V4 of power source node 510, pull-up resistor R4 and resistance element R1 in CCID 330.

Further, when control pilot line L1 is short-circuited (GND short-circuit) to chassis ground 512, the potential of pilot signal CPLT attains to the ground level.

In contrast, when the potential of pilot signal CPLT is at the same level as the voltage V4 of power source node 510, that is, when there is no voltage drop on pilot signal CPLT, CPU 508 outputs a control signal S2 at the H level and thereby turns on switch SW3 of resistance circuit 502. Thus, the factor can be classified.

More specifically, when charging lid 280 is open, the potential of pilot signal CPLT attains to the potential determined by the voltage V4 of power source node 510, pull-up resistor R4 and pull-down resistor R3 of resistance circuit 502. On the other hand, if control pilot line L1 is disconnected, the potential of pilot signal CPLT is maintained at the same level as voltage V4 of power source node 510.

Therefore, CPU 508 monitors the potential of pilot signal CPLT communicated through control pilot line L1, and compares the potential of pilot signal CPLT with the relations shown in FIGS. 7 and 8, whereby the state of connection of charging cable 300 and the state of control pilot line L1 can be detected. Further, if charging connector 310 is in the half-fit state, start of charge control of electrically powered vehicle can be prevented.

As described above, in Embodiment 1, the state of connection of charging cable and the state of control pilot line are detected utilizing signals standardized in relation to charging of electrically powered vehicle and, therefore, it becomes unnecessary to provide a dedicated line for detecting these states. As a result, increase of circuit scale to be housed in the charging connector and in the vehicle inlet can be avoided.

Modification of Embodiment 1

Figures 9, 10:
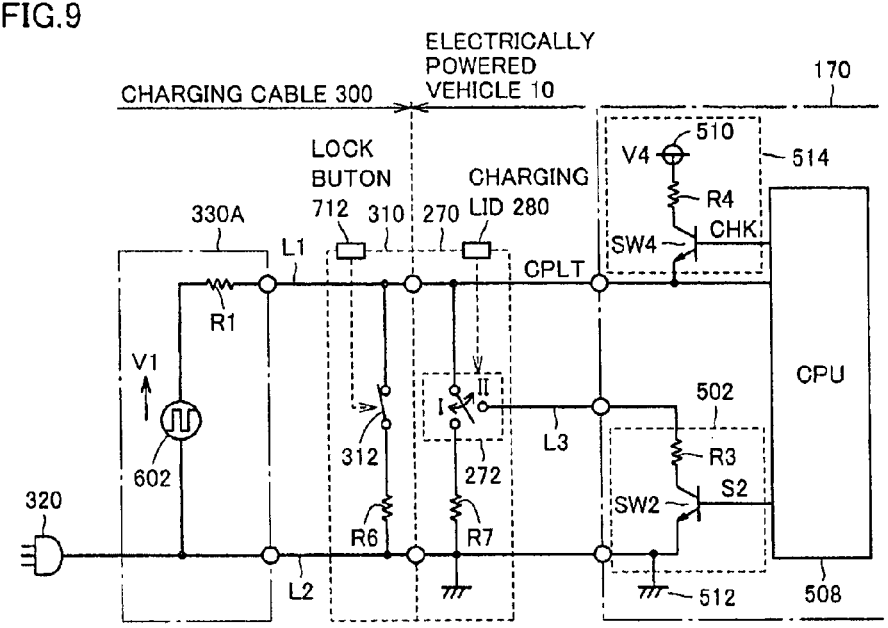
FIG. 9 shows a configuration of a charge controller for an electrically powered vehicle in accordance with a modification of Embodiment 1.
FIG. 10 illustrates a state of the charge controller detected by the CPU shown in FIG. 9.

FIG. 9 is a circuit diagram showing a configuration of the charge controller of the electrically powered vehicle in accordance with a first modification of the present embodiment. Referring to FIG. 9, the charge controller in accordance with the present modification differs from the charge controller shown in FIG. 6 in that it includes a CCID 330A in place of CCID 330.

In CCID 330A, when the potential of pilot signal CPLT detected by voltage sensor 604 (FIG. 2) is close to the predetermined potential V1 (for example, 12V), oscillator 602 outputs a non-oscillating signal. CCID 330A differs from CCID 330 shown in FIG. 6 in that it does not include a switch 612 for forming control pilot line L1 bypassing oscillator 602.

Figures 11, 12:
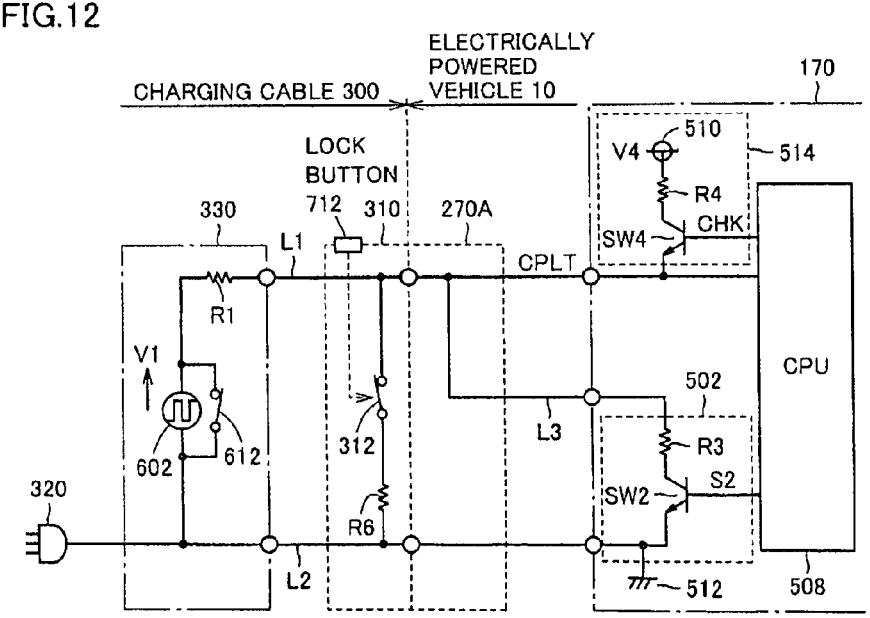
FIG. 11 illustrates a state of the charge controller detected by the CPU shown in FIG. 9.
FIG. 12 is a circuit diagram showing a configuration of a charge controller for an electrically powered vehicle in accordance with Embodiment 2.

By such a configuration, in the charge controller in accordance with the present modification, the states shown in FIGS. 10 and 11 can be detected by CPU 508 monitoring the potential of pilot signal CPLT.

FIGS. 10 and 11 illustrate states of the charge controller detected by the CPU shown in FIG. 9. FIG. 10 shows the state between the potential of pilot signal CPLT and the state of charge controller when switch SW4 of voltage generating circuit 514 is off and switch SW2 of resistance circuit 502 is off, and FIG. 11 shows the state between the potential of pilot signal CPLT and the state of charge controller when switch SW4 of voltage generating circuit 514 is turned on.

The relation shown in FIG. 10 is the same as that shown in FIG. 7. In FIG. 10 also, when no voltage is supplied from CCID 330A, no potential is generated on control pilot line L1 and the potential of pilot signal CPLT attains to the ground level. Here, in ECU 170, CPU 508 drives voltage generating circuit 514 (that is, switches the control signal CHK to the H, level) to generate a voltage on control pilot line L1. Thus, as shown in FIG. 11, the factor can be classified.

Referring to FIG. 11, when switch SW4 is turned on and the voltage V4 of power source node 510 is supplied to control pilot line L1, provided that charging lid 280 is closed, the potential of pilot signal CPLT attains to the potential determined by the voltage V4 of power source node 510, pull-up resistor R4 and pull-down resistor R7 connected to ground line L2.

In contrast, if control pilot line L1 is short-circuited (GND short-circuit) to chassis ground 512, the potential of pilot signal CPLT attains to the ground level.

Further, if the potential of pilot signal CPLT is at the same level as voltage V4 of power source node 510, that is, when there is no voltage drop on pilot signal CPLT, CPU 508 outputs a control signal S2 at the H level and thereby turns on switch SW3 of resistance circuit 502. Thus, the factor can be classified.

More specifically, when charging lid 280 is open, the potential of pilot signal CPLT attains to the potential determined by the voltage V4 of power source node 510, pull-up resistor R4 and pull-down resistor R3 of resistance circuit 502. On the other hand, if control pilot line L1 is disconnected, the potential of pilot signal CPLT is maintained at the same level as voltage V4 of power source node 510. If plug 320 and power source receptacle 400 are not connected, the terminal outputting pilot signal CPLT of CCID 330A attains to the high-impedance state and, therefore, the potential of pilot signal CPLT is maintained at the same level as voltage V4 of power source node 510.

Therefore, in the charge controller in accordance with the present modification also, CPU 508 monitors the potential of pilot signal CPLT communicated through control pilot line L1, and compares the potential of pilot signal CPLT with the relations shown in FIGS. 10 and 11, whereby the state of connection of charging cable 300 and the state of control pilot line L1 can be detected. Further, if charging connector 310 is in the half-fit state, start of charge control of electrically powered vehicle can be prevented.

Embodiment 2

Embodiment 1 is configured such that switch circuit 272 for switching connection depending on open/close state of charging lid 280 is provided in vehicle inlet 270, and the open/close state of charging lid 280 is detected based on the potential of pilot signal CPLT. If charging lid 280 is adapted to be opened/closed manually, the charge controller for an electrically powered vehicle may have such a configuration as shown in FIG. 12.

FIG. 12 is a circuit diagram showing a configuration of a charge controller for an electrically powered vehicle in accordance with Embodiment 2.

Referring to FIG. 12, the charge controller in accordance with Embodiment 2 differs from the charge controller shown in FIG. 6 in that it includes a vehicle inlet 270A in place of vehicle inlet 270.

Vehicle inlet 270A includes a signal line L3 branched from control pilot line L1. Resistance circuit 502 is connected between signal line L3 and ground line L2 connected to chassis ground 512.

FIG. 13 illustrates a state of the charge controller detected by the CPU shown in FIG. 12.

Referring to FIG. 13, when switch SW4 of voltage generating circuit 514 is off and switch SW2 of resistance circuit 502 is off, that is, when external power source 402 and electrically powered vehicle 10 are connected, or when plug 320 is connected to power source receptacle 400 and charging connector 310 is connected to vehicle inlet 270, the potential of pilot signal CPLT is the predetermined potential V1.

In contrast, when charging connector 310 is at the half-fit state, the potential of pilot signal CPLT lowers to the potential corresponding to the predetermined potential V1 divided by resistance element RI in CCID 330 and pull-down resistor R6 in charging connector 310.

If the potential of pilot signal CPLT should be decreased even if charging connector 310 is not in the half-fit state, it can be determined that limit switch 312 is on-fixed.

Further, if no voltage is supplied from CCID 330, no potential generates on control pilot line L1, and the potential of pilot signal CPLT attains to the ground level. In this case, in ECU 170, CPU 508 outputs control signal CHK at the H level and thereby turns on switch SW4 of voltage generating circuit 514, so that a voltage is generated on control pilot line L1.

Next, when switch SW4 is turned on and voltage V4 of power source node 510 is supplied to control pilot line L1, provided that plug 320 is not connected to power source receptacle 400, the potential of pilot signal CPLT attains to the potential determined by voltage V4 of power source node 510, pull-up resistor R4 and resistance element R1 in CCID 330.

Further, if control pilot line 320 is short-circuited (GND short-circuit) to chassis ground 512, the potential of pilot signal CPLT attains to the ground level.

In contrast, if the potential of pilot signal CPLT is at the same level as voltage V4 of power source node 510, that is, when there is no voltage drop on pilot signal CPLT, CPU 508 outputs a control signal S2 at the H level and thereby turns on switch SW3 of resistance circuit 502. At this time, if control pilot line L1 is disconnected, the potential of pilot signal CPLT is maintained at the same level as voltage V4 of power source node 510. If charging connector 310 is not connected to vehicle inlet 270A, the potential of pilot signal CPLT attains to the potential determined by voltage V4 of power source node 510, pull-up resistor R4, and pull-down resistor R3 of resistance circuit 502.

Therefore, in the configuration of charge controller shown in FIG. 12 also, CPU 508 monitors the potential of pilot signal CPLT communicated through control pilot line L1, and compares the potential of pilot signal CPLT with the relations shown in FIG. 13, whereby the state of connection of charging cable 300 and the state of control pilot line L1 can be detected.

Modification of Embodiment 2

FIG. 14 is a circuit diagram showing a configuration of a charge controller for an electrically powered vehicle in accordance with a modification of Embodiment 2. Referring to FIG. 14, the charge controller in accordance with the present modification differs from the charge controller shown in FIG. 12 in that it includes CCID 330A in place of CCID 330.

In CCID 330A, when the potential of pilot signal CPLT detected by voltage sensor 604 (FIG. 2) is close to the predetermined potential V1 (for example, 12V), oscillator 602 outputs a non-oscillating signal. CCID 330A differs from CCID 330 shown in FIG. 12 in that it does not include a switch 612 for forming control pilot line L1 bypassing oscillator 602.

By such a configuration, in the charge controller in accordance with the present modification, the states shown in FIG. 15 can be detected by CPU 508 monitoring the potential of pilot signal CPLT.

FIG. 15 illustrates a state of the charge controller detected by CPU 508 shown in FIG. 14.

Referring to FIG. 15, when switch SW4 of voltage generating circuit 514 is off and switch SW2 of resistance circuit 502 is off, that is, when external power source 402 and electrically powered vehicle 10 are connected, or when plug 320 is connected to power source receptacle 400 and charging connector 310 is connected to vehicle inlet 270, the potential of pilot signal CPLT is the predetermined potential V1.

In contrast, when charging connector 310 is at the half-fit state, the potential of pilot signal CPLT lowers to the potential corresponding to the predetermined potential V1 divided by resistance element R1 in CCID 330A and pull-down resistor R6 in charging connector 310.

If the potential of pilot signal CPLT should be decreased even if charging connector 310 is not in the half-fit state, it can be determined that limit switch 312 is on-fixed.

Further, if no voltage is supplied from CCID 330A, no potential generates on control pilot line L1, and the potential of pilot signal CPLT attains to the ground level. In this case, in ECU 170, CPU 508 outputs control signal CHK at the H level and thereby turns on switch SW4 of voltage generating circuit 514, so that a voltage is generated on control pilot line L1.

Next, when switch SW4 is turned on and voltage V4 of power source node 510 is supplied to control pilot line L1, and if control pilot line L1 is short-circuited to chassis ground 512 (GND short-circuit), then the potential of pilot signal CPLT attains to the ground level.

In contrast, if the potential of pilot signal CPLT is at the same level as voltage V4 of power source node 510, that is, when there is no voltage drop on pilot signal CPLT, CPU 508 outputs a control signal S2 at the H level and thereby turns on switch SW3 of resistance circuit 502. At this time, if control pilot line L1 is disconnected, the potential of pilot signal CPLT is maintained at the same level as voltage V4 of power source node 510. If plug 320 and power source receptacle 400 are not connected, the terminal outputting pilot signal CPLT of CCID 330A attains to the high-impedance state and, therefore, the potential of pilot signal CPLT is maintained at the same level as voltage V4 of power source node 510.

If charging connector 310 is not connected to vehicle inlet 270A, the potential of pilot signal CPLT attains to the potential determined by voltage V4 of power source node 510, pull-up resistor R4, and pull-down resistor R3 of resistance circuit 502.

Therefore, in the charge controller in accordance with the present modification also, CPU 508 monitors the potential of pilot signal CPLT communicated through control pilot line L1, and compares the potential of pilot signal CPLT with the relations shown in FIG. 15, whereby the state of connection of charging cable 300 and the state of control pilot line L1 can be detected.

Embodiment 3

FIG. 16 is a circuit diagram showing a configuration of a charge controller for an electrically powered vehicle in accordance with Embodiment 3.

Referring to FIG. 16, the charge controller in accordance with Embodiment 3 differs from the charge controller shown in FIG. 6 in that it includes vehicle inlet 270B in place of vehicle inlet 270.

Vehicle inlet 270B includes a switch 274 and a pull-down resistor R7 connected in series between control pilot line L1 and ground line L1 On/off of switch 274 is controlled in accordance with open/close state of charging lid 280. Specifically, when charging lid 280 is closed, switch 274 is turned on and electrically connects control pilot line L1 to ground line L2. When charging lid 280 is open, switch 274 is turned off and electrically separates control pilot line L1 from ground line L2.

As described above, between control pilot line L1 and ground line L2, a plurality of switches each turned on/off depending on the open/close state of charging lid 280 and on the operation of lock button 712 are connected in parallel. Therefore, the potential of pilot signal CPLT changes in accordance with the state of connection of charging connector 310 and the state of open/close of charging lid 280. By monitoring the potential of pilot signal CPLT, CPU 508 detects these states.

FIG. 17 illustrates a state of the charge controller detected by CPU 508 shown in FIG. 16.

Referring to FIG. 17, when switch SW4 of voltage generating circuit 514 is off, that is, when external power source 402 and electrically powered vehicle 10 are connected, or when plug 320 is connected to power source receptacle 400 and charging connector 310 is connected to vehicle inlet 270B, the potential of pilot signal CPLT is the predetermined potential V1.

In contrast, when charging connector 310 is at the half-fit state, the potential of pilot signal CPLT lowers to the potential corresponding to the predetermined potential V1 divided by resistance element R1 in CCID 330 and pull-down resistor R6 in charging connector 310.

If the potential of pilot signal CPLT should be decreased even if charging connector 310 is not in the half-fit state, it can be determined that limit switch 312 is on-fixed.

Further, if the potential of pilot signal CPLT should be decreased to the potential corresponding to the predetermined voltage V1 divided by resistance element R1 in CCID 330 and pull-down resistor R7 in vehicle inlet 270B, it can be determined that switch 274 is on-fixed.

Further, if no voltage is supplied from CCID 330, no potential generates on control pilot line L1 and the potential of pilot signal CPLT attains to the ground level. In this case, in ECU 170, CPU 508 outputs control signal CHK at the H level and thereby turns on switch SW4 of voltage generating circuit 514, so that a voltage is generated on control pilot line L1.

Next, when switch SW4 is turned on and voltage V4 of power source node 510 is supplied to control pilot line L1, if charging lid 280 is closed, switch 274 is on and, therefore, the potential of pilot signal CPLT attains to the potential determined by voltage V4 of power source node 510, pull-up resistor R4 and pull-down resistor R7 in vehicle inlet 270B.

In contrast, if charging lid 280 is open, switch 274 is off and, therefore, the potential of pilot signal CPLT attains to the same level as voltage V4 of power source node 510.

If the potential of pilot signal CPLT should be at the same level as voltage V4 of power source node 510 even if charging lid 280 is closed, it can be determined that control pilot line is disconnected.

Further, if the potential of pilot signal CPLT should be at the ground level even after switch SW4 is turned on and voltage V4 of power source node 510 is supplied to control pilot line L1, it can be determined that control pilot line L1 is short-circuited (GND short-circuit) to chassis ground 512. On the other hand, if plug 320 is not connected to power source receptacle 400, bypass switch 612 in CCID 330 is turned on and, therefore, the potential of pilot signal CPLT attains to the potential determined by voltage V4 of power source node 510, pull-up resistor R4 and resistance element R1 of CCID 330.

As described above, in the configuration of charge controller shown in FIG. 16 also, CPU 508 monitors the potential of pilot signal CPLT communicated through control pilot line L1, and compares the potential of pilot signal CPLT with the relations shown in FIG. 17, whereby the state of connection of charging cable 300 and the state of control pilot line L1 can be detected.

Modification of Embodiment 3

FIG. 18 is a circuit diagram showing a configuration of a charge controller for an electrically powered vehicle in accordance with a modification of Embodiment 3. Referring to FIG. 18, the charge controller in accordance with the present modification differs from the charge controller shown in FIG. 16 in that it includes CCID 330A in place of CCID 330. CCID 330A differs from CCID 330 shown in FIG. 16 in that it does not include a switch 612 for forming control pilot line L1 bypassing oscillator 602.

By such a configuration, in the charge controller in accordance with the present modification, the states shown in FIG. 19 can be detected by CPU 508 monitoring the potential of pilot signal CPLT.

FIG. 19 illustrates a state of the charge controller detected by CPU 508 shown in FIG. 18.

Referring to FIG. 19, when switch SW4 of voltage generating circuit 514 is off, that is, when external power source 402 and electrically powered vehicle 10 are connected, or when plug 320 is connected to power source receptacle 400 and charging connector 310 is connected to vehicle inlet 270B, the potential of pilot signal CPLT is the predetermined potential V1.

In contrast, when charging connector 310 is at the half-fit state, the potential of pilot signal CPLT lowers to the potential corresponding to the predetermined potential V1 divided by resistance element R1 in CCID 330A and pull-down resistor R6 in charging connector 310.

If the potential of pilot signal CPLT should be decreased even if charging connector 310 is not in the half-fit state, it can be determined that limit switch 312 is on-fixed.

Further, if the potential of pilot signal CPLT should be decreased to the potential corresponding to the predetermined voltage V1 divided by resistance element R1 in CCID 330 and pull-down resistor R7 in vehicle inlet 270B, it can be determined that switch 274 is on-fixed.

Further, if no voltage is supplied from CCID 330, no potential generates on control pilot line L1, and the potential of pilot signal CPLT attains to the ground level. In this case, in ECU 170, CPU 508 outputs control signal CHK at the H level and thereby turns on switch SW4 of voltage generating circuit 514, so that a voltage is generated on control pilot line L1.

Next, when switch SW4 is turned on and voltage V4 of power source node 510 is supplied to control pilot line L1, if charging lid 280 is closed, switch 274 is on and, therefore, the potential of pilot signal CPLT attains to the potential determined by voltage V4 of power source node 510, pull-up resistor R4 and pull-down resistor R7 in vehicle inlet 270B.

In contrast, if charging lid 280 is open, switch 274 is off and, therefore, the potential of pilot signal CPLT attains to the same level as voltage V4 of power source node 510.

If the potential of pilot signal CPLT should be at the same level as voltage V4 of power source node 510 even if charging lid 280 is closed, it can be determined that control pilot line L1 is disconnected. If plug 320 and power source receptacle 400 are not connected, the terminal outputting pilot signal CPLT of CCID 330A attains to the high-impedance state and, therefore, the potential of pilot signal CPLT is maintained at the same level as voltage V4 of power source node 510.

Further, if the potential of pilot signal CPLT should be at the ground level even after switch SW4 is turned on and voltage V4 of power source node 510 is supplied to control pilot line L1, it can be determined that control pilot line L1 is short-circuited (GND short-circuit) to chassis ground 512.

Though a configuration in which switch 274 in vehicle inlet 270B is turned on/off depending on the open/close state of charging lid 280 has been described in Embodiment 3 above, the on/off may be controlled in accordance with a control signal output from CPU 508. In that case, switch 274 is configured such that it is kept on in accordance with the control signal from CPU 508 until connection between charging connector 310 and vehicle inlet 270B is detected, and it is turned off in accordance with the control signal from CPU 508 when connection between charging connector 310 and vehicle inlet 270E is detected. Based on the potential generated on control pilot line L1 while switch 274 is on, CPU 508 can detect disconnection or short-circuit of control pilot line L1.

Embodiment 4

In Embodiment 4, a lighting device for indicating the state of execution of charging of the power storage device is attached to the charge controller in accordance with Embodiment 1. Electric power to the lighting device is supplied utilizing existing wires.

Figure 20:
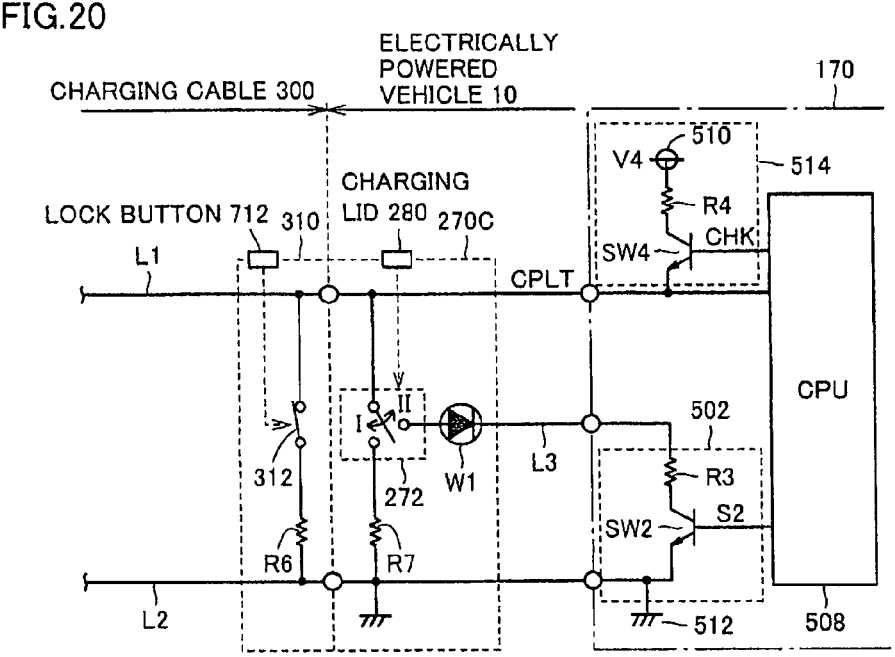
FIG. 20 is a circuit diagram showing a configuration of a charge controller for an electrically powered vehicle in accordance with Embodiment 4.

FIG. 20 is a circuit diagram showing a configuration of a charge controller for an electrically powered vehicle in accordance with Embodiment 4.

Referring to FIG. 20, the charge controller in accordance with Embodiment 4 differs from the charge controller shown in FIG. 6 in that it includes a vehicle inlet 270C in place of vehicle inlet 270.

Vehicle inlet 270C includes a switch circuit 272, a pull-down resistor R7 and a lighting device W1, connected in series between control pilot line L1 and ground line L2. Lighting device W1 is provided on a signal line L3. Lighting device W1 is implemented, for example, by a lamp using a light emitting diode, and it indicates three states of lit/flickered/off.

By such a configuration, if charging lid 280 is closed, switch circuit 272 is set to the I side and, therefore, control pilot line L1 is electrically separated from lighting device W1. Therefore, lighting device W1 is turned off On the other hand, if charging lid is open, switch circuit 272 is set to the II side and, therefore, control pilot line L1 is connected to lighting device W1.

Here, in resistance circuit 502, as means for operating the potential of pilot signal CPLT, switch SW2 is turned on (see FIG. 4) after the timing when connection between charging connector 310 and vehicle inlet 270C is detected. Therefore, lighting device W1 is lit, receiving the potential of pilot signal. CPLT through signal line L3. The potential of pilot signal CPLT decreases to the ground level when power storage device is not charged and, therefore, lighting device W1 is turned off. Specifically, lighting device W1 functions as an indicating unit indicating the state of execution of charging of the power storage device. Since lighting device W1 is lit utilizing pilot signal CPLT that is standardized in relation to charging of the electrically powered vehicle, provision of a dedicated power source or dedicated wire for the lighting device becomes unnecessary. As a result, increase in circuit scale to be housed in the vehicle inlet can be avoided.

Figure 21:
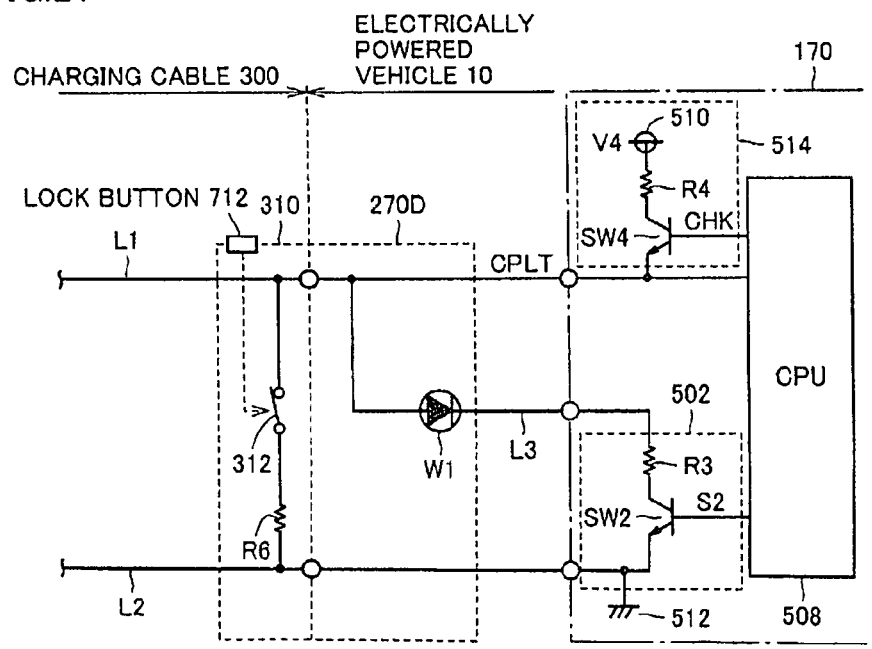
FIG. 21 is a circuit diagram showing another configuration of a charge controller for an electrically powered vehicle in accordance with Embodiment 4.

The configuration of lighting lighting device W1 utilizing the pilot signal described above may be applied to the charge controller in accordance with Embodiment 2. FIG. 21 is a circuit diagram showing another configuration of a charge controller for an electrically powered vehicle in accordance with Embodiment 4. Referring to FIG. 21, the charge controller in accordance with a modification of Embodiment 4 differs from the charge controller shown in FIG. 12 in that it includes a vehicle inlet 270D in place of vehicle inlet 270A. Vehicle inlet 270D includes signal line L3 branched from control pilot line L1 and lighting device W1 provided on signal line L3.

By such a structure, after switch SW2 of resistance circuit 502 is turned on in response to detection of connection between charging connector 310 and vehicle inlet 270D, lighting device W1 is lit, receiving the potential of pilot signal CPLT. Specifically, lighting device W1 functions as an indicating unit indicating the state of execution of charging of the power storage device.

Embodiment 5

In Embodiment 5, to support charging of electrically powered vehicle at night, a lighting device for illumination is attached to the charging connector of the charge controller in accordance with Embodiment 1. Electric power to the lighting device is supplied utilizing existing wires.

Figure 22:
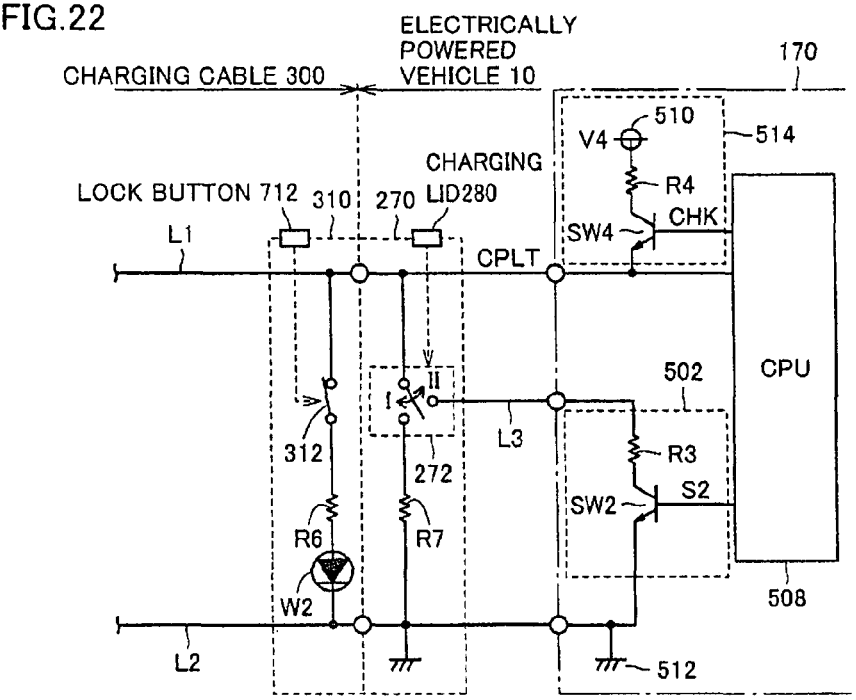
FIG. 22 is a circuit diagram showing a configuration of a charge controller for an electrically powered vehicle in accordance with Embodiment 5.

FIG. 22 is a circuit diagram showing a configuration of a charge controller for an electrically powered vehicle in accordance with Embodiment 5.

Referring to FIG. 22, the charge controller in accordance with Embodiment 4 differs from the charge controller shown in FIG. 6 in that it includes a charging connector 310A in place of charging connector 310.

Charging connector 310A includes a limit switch 312, pull-down resistor R6 and a lighting device W2 connected in series between control pilot line L1 and ground line L2.

By such a configuration, when lock button 712 is in the released state, that is, when charging connector 310A is not locked in vehicle inlet 270, limit switch 312 is turned on in charging connector 310A and, therefore, lighting device W2 is lit, receiving the potential of pilot signal CPLT. Lighting device W2 is provided to illuminate the same direction as the direction in which connection unit 713 (FIG. 5) of charging connector 310A is connected. Therefore, lighting device W2 functions as an illumination illuminating vehicle inlet 270.

Figure 23:
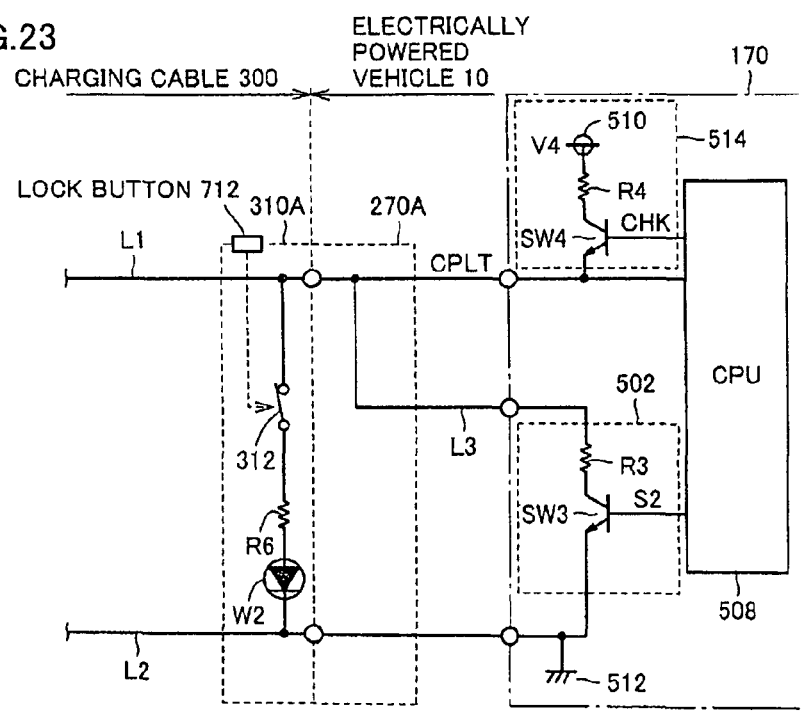
FIG. 23 is a circuit diagram showing another configuration of a charge controller for an electrically powered vehicle in accordance with Embodiment 5.
Figure 24:
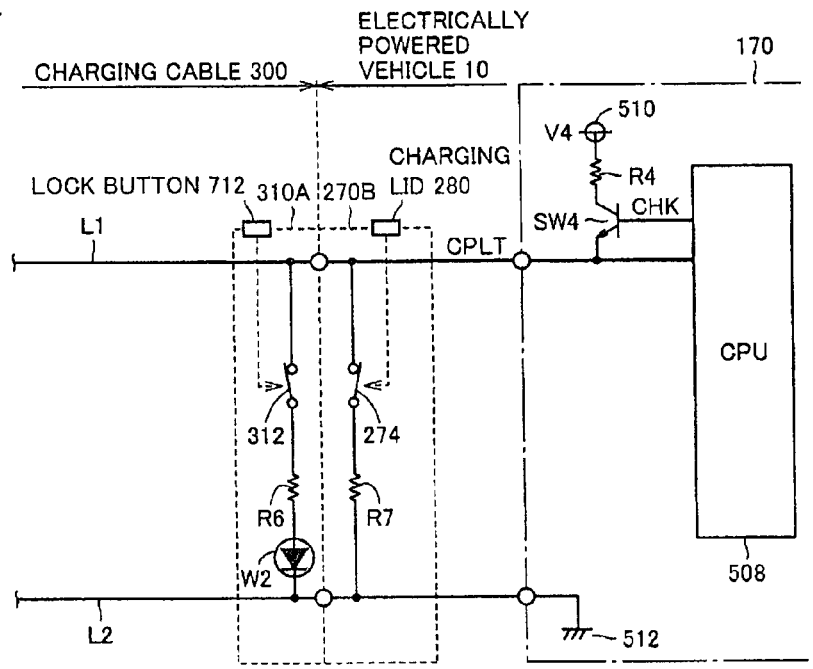
FIG. 24 is a circuit diagram showing a still another configuration of a charge controller for an electrically powered vehicle in accordance with Embodiment 5.

The configuration of lighting lighting device W2 utilizing pilot signal CPLT is also applicable to the charge controllers in accordance with Embodiments 2 and 3. FIGS. 23 and 24 show other configurations of a charge controller for an electrically powered vehicle in accordance with Embodiment 5.

In these configurations, when charging connector 310A is not locked in vehicle inlet 270A (or 270B), lighting device W2 is lit, receiving the potential of pilot signal CPLT.

Since lighting device W2 is lit utilizing pilot signal CPLT, the work of connecting the charging connector to the vehicle inlet at the start of charging at night can be made easier, without necessitating dedicated power source or dedicated wire for illumination.

Figure 25:
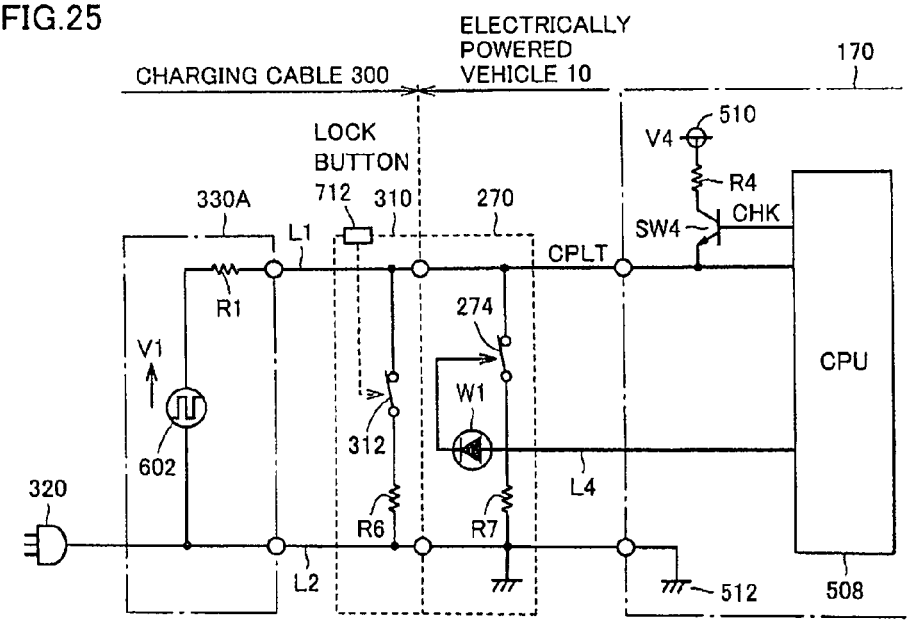
FIG. 25 is a circuit diagram showing a configuration of a charge controller for an electrically powered vehicle in accordance with a modification of Embodiment 5.

Further, if the charge controller in accordance with Embodiment 3 is configured such that on/off of switch 274 in vehicle inlet 270B is controlled in accordance with the control signal output from CPU 508 as described above, the lighting device may be provided on the signal line for communicating the control signal, as shown in FIG. 25.

FIG. 25 is a circuit diagram showing a configuration of a charge controller for an electrically powered vehicle in accordance with a modification of Embodiment 5. Referring to FIG. 25, the charge controller in accordance with the modification of Embodiment 5 differs from the charge controller shown in FIG. 18 in that it includes vehicle inlet 270C in place of vehicle inlet 270B.

In vehicle inlet 270C, switch 274 is turned on/off in accordance with the control signal from CPU 508. Specifically, a signal line L4 for communicating the control signal is connected to a driving coil (not shown) of switch 274. Switch 274 is configured such that it is turned off when an actuation current as the control signal flows through the driving coil via signal line L4. On signal line L4, lighting device W1 is provided. Lighting device W1 is lit, receiving the actuation current. Specifically, when switch 274 is off, that is, when charging connector 310 is connected to vehicle inlet 270C, lighting device W1 is lit. Thus, lighting device W1 functions as an indicating unit indicating the state of execution of charging of the power storage device.

In each of the embodiments described above, the CCID is provided at a middle portion of the charging cable. The position is not limited to the middle portion, and the charging connector to be connected to the electrically powered vehicle and the CCID may be integrated, or the plug to be connected to the external power source and the CCID may be integrated.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a charging cable and to a charging system for an electrically powered vehicle.

REFERENCE SIGNS LIST 10 electrically powered vehicle, 130 vehicle wheels, 150 power storage device, 160 power converter, 180 motor driving device, 182 voltage sensor, 190 relay, 270, 270A-270D vehicle inlets, 272 switch circuit, 274 switch, 280 charging lid, 300 charging cable, 310, 310A charging connectors, 312 limit switch, 320 plug, 332 CCID relay, 334 control pilot circuit, 340, 340a, 340b electric wire unit, 400 power source receptacle, 402 external power source, 502 resistance circuit, 504 input buffer, 510 power source node, 51,2 chassis ground, 514 voltage generating circuit, 602 oscillator, 604 voltage sensor, 606 magnetic coil, 608 electrical leakage detector, 610 CCID control unit, 612 switch, 650 voltage sensor, 660 current sensor, 712 lock button, 713 connection unit, ACL1, ACL2 power lines, L1 control pilot line, L2 ground line, L3, L4 signal lines, R1 resistance element, R2, R3, R6, R7 pull-down resistors, R4 pull-up resistor, SW1 SW4 switches, W1, W2 lighting devices.

The invention claimed is:

1. A charge controller for an electrically powered vehicle, configured to enable charging of a power storage device mounted on the electrically powered vehicle from a power source outside of the vehicle, comprising:

a charging cable for connecting said power source to said electrically powered vehicle;

a charging inlet provided on said electrically powered vehicle, configured to be connectable to said charging cable; and a control device provided on said electrically powered vehicle, for receiving a control signal indicating information of electric power supplied to said electrically powered vehicle, transmitted from said charging cable; wherein said charging cable includes
a charging connector configured to be connectable to said charging inlet, a plug configured to be connectable to said power source, and an electric wire unit provided between said charging connector and said plug;

said electric wire unit includes
a power line for supplying electric power from said power source to said electrically powered vehicle, a control line for communicating said control signal, and a ground line connected to a chassis ground; and said control device includes a switch for switching whether to supply or not to supply a voltage from a power source to said control line, and detects presence/absence of the voltage supplied to said control line to determine state of connection of said charging cable and state of said control line.

2. The charge controller for the electrically powered vehicle according to claim 1, wherein said charging connector includes a lock button for locking said charging connector to said charging inlet, and a first switch configured to electrically connect said control line to said ground line when said lock button is in a released state, and to electrically separate said control line from said ground line when said lock button is in a locked state; and said control device detects the state of connection of said charging connector based on the potential of said control signal when the voltage is not supplied to said control line.

3. The charge controller for the electrically powered vehicle according to claim 2, wherein said control device is configured to supply the voltage to said control line if it is detected that no potential of said control signal is generated while no voltage is supplied to said control line, and detects short-circuit of said control line to said chassis ground based on the potential of said control signal when the voltage is supplied to said control line.

4. The charge controller for the electrically powered vehicle according to claim 3, wherein
said charging cable further includes
a charging device configured to generate said control signal to be output to said control line, and
a second switch configured to form said control line bypassing said charging device when said plug is not connected to said power source; and
said control device detects disconnection of said control line and state of connection of said plug based on the potential of said control signal when the voltage is supplied to said control line.

5. The charge controller for the electrically powered vehicle according to claim 1, further comprising
a resistance circuit, mounted on said electrically powered vehicle configured to change the potential of said control line when connected to said control line; wherein
said control device is configured to supply the voltage to said control line if it is detected that no potential of said control signal is generated while no voltage is supplied to said control line, and detects short-circuit of said control line to said chassis ground and the state of connection of said charging connector, based on the potential of said control signal in accordance with presence/absence of connection of said resistance circuit to said control line, when the voltage is supplied to said control line.

6. The charge controller for the electrically powered vehicle according to claim 5, wherein
said charging cable further includes
a charging device configured to generate said control signal to be output to said control line, and
a second switch configured to form said control line bypassing said charging device when said plug is not connected to said power source; and
said control device further detects disconnection of said control line and state of connection of said plug based on the potential of said control signal in accordance with presence/absence of connection of said control line to said resistance circuit, when the voltage is supplied to said control line.

7. The charge controller for the electrically powered vehicle according to claim 1, further comprising:
an opening, provided in said electrically powered vehicle, for housing said charging inlet; wherein
said charging inlet includes a third switch for electrically connecting said control line to said ground line when a lid of said opening is closed, and for electrically separating said control line from said ground line when said lid is open; and
said control device is configured to supply the voltage to said control line if it is detected that no potential of said control signal is generated while no voltage is supplied to said control line, and further detects open/close state of said lid based on the potential of said control signal when the voltage is supplied to said control line.

8. The charge controller for the electrically powered vehicle according to claim 1, further comprising:
a resistance circuit, mounted on said electrically powered vehicle, configured to change the potential of said control line when connected to said control line; and
an opening, provided in said electrically powered vehicle, for housing said charging inlet; wherein
said charging inlet includes a switch circuit configured to electrically connect said control line to said ground line when a lid of said opening is closed, and to electrically connect said control line to said resistance circuit when said lid is open; and
said control device further detects open/close state of said lid and a failure of said switch circuit, based on the potential of said control signal in accordance with presence/absence of the voltage supplied to said control line.

9. The charge controller for the electrically powered vehicle according to claim 8, wherein
said charging cable further includes
a charging device configured to generate said control signal to be output to said control line, and
a second switch configured to form said control line bypassing said charging device when said plug is not connected to said power source; and
said control device detects disconnection and short-circuit to said chassis ground of said control line and state of connection of said plug based on the potential of said control signal when the voltage is supplied to said control line.

10. The charge controller for the electrically powered vehicle according to claim 1, wherein
said charging inlet further includes a first lighting device drivable in accordance with said control signal.

11. The charge controller for the electrically powered vehicle according to claim 1, wherein
said charging connector further includes a lighting device drivable in accordance with said control signal.

* * * * *